United States Patent
Li et al.

(10) Patent No.: US 12,024,203 B2
(45) Date of Patent: Jul. 2, 2024

(54) METHOD FOR LEARNING AN EXPLAINABLE TRAJECTORY GENERATOR USING AN AUTOMATON GENERATIVE NETWORK

(71) Applicants: TOYOTA RESEARCH INSTITUTE, INC., Los Altos, CA (US); MASSACHUSETTS INSTITUTE OF TECHNOLOGY, Cambridge, MA (US)

(72) Inventors: Xiao Li, Medford, MA (US); Brandon Araki, Cambridge, MA (US); Sertac Karaman, Cambridge, MA (US); Daniela Rus, Weston, MA (US); Guy Rosman, Newton, MA (US); Igor Gilitschenski, Cambridge, MA (US); Cristian-Ioan Vasile, Bethlehem, PA (US)

(73) Assignees: Toyota Research Institute, Los Altos, CA (US); Massachusetts Institute of Technology, Cambridge, MA (US)

( * ) Notice: Subject to any disclaimer, the term of this patent is extended or adjusted under 35 U.S.C. 154(b) by 468 days.

(21) Appl. No.: 17/372,083

(22) Filed: Jul. 9, 2021

(65) Prior Publication Data
US 2023/0062810 A1  Mar. 2, 2023

(51) Int. Cl.
*G06N 3/04* (2023.01)
*B60W 60/00* (2020.01)
*G06N 3/08* (2023.01)

(52) U.S. Cl.
CPC .......... *B60W 60/0027* (2020.02); *G06N 3/04* (2013.01); *G06N 3/08* (2013.01); *B60W 2554/4041* (2020.02); *B60W 2554/4042* (2020.02); *B60W 2554/4043* (2020.02); *B60W 2554/408* (2020.02)

(58) Field of Classification Search
CPC .............. G06N 3/04; G06N 3/06; G06N 3/08
See application file for complete search history.

(56) References Cited

U.S. PATENT DOCUMENTS

| 5,943,659 A | 8/1999 | Giles et al. |
| 2020/0231210 A1* | 7/2020 | Anderson ............ G05D 1/0238 |

(Continued)

OTHER PUBLICATIONS

Araki, et al. "Learning to Plan with Logical Automata." Robotics: Science and Systems 2019, Jun. 2019, Freiburg, Germany, Robotics: Science and Systems Foundation, Jun. 2019.

(Continued)

*Primary Examiner* — Sam Bhattacharya
(74) *Attorney, Agent, or Firm* — SEYFARTH SHAW LLP

(57) ABSTRACT

A method of generating an output trajectory of an ego vehicle is described. The method includes extracting high-level features from a bird-view image of a traffic environment of the ego vehicle. The method also includes generating, using an automaton generative network, an automaton including an automaton state distribution describing a behavior of the ego vehicle in the traffic environment according to the high-level features. The method further includes generating the output trajectory of the ego vehicle according to extracted bird-view features of the bird-view image and the automaton state distribution describing the behavior of the ego vehicle in the traffic environment.

17 Claims, 14 Drawing Sheets

(56) References Cited

U.S. PATENT DOCUMENTS

2021/0269058 A1\* 9/2021 Aota ................. B60W 60/0025
2021/0312209 A1\* 10/2021 Ye ........................ G06V 10/806

OTHER PUBLICATIONS

Grachev, et al., "Neural network for synthesizing deterministic finite automata", 6th International Young Scientists Conference in HPC and Simulation, YSC 2017, Kotka, Finland, Nov. 1-3, 2017.
Weiss, et al., "Extracting Automata from Recurrent Neural Networks Using Queries and Counterexamples", Proceedings of the 35th International Conference on Machine Learning, Stockholm, Sweden, PMLR 80, 2018.
Araki, et al., "The Logical Options Framework", arXiv:2102.12571, Feb. 24, 2021.
Icarte, et al., "Learning reward machines for partially observable reinforcement learning." Advances in Neural Information Processing Systems 32 (2019): 15523-15534.
Furelos-Blanco, et al. "Induction and exploitation of subgoal automata for reinforcement learning." Journal of Artificial Intelligence Research 70 (2021): 1031-1116.

\* cited by examiner

METHOD FOR LEARNING AN EXPLAINABLE TRAJECTORY GENERATOR USING AN AUTOMATON GENERATIVE NETWORK

BACKGROUND

Field

Certain aspects of the present disclosure generally relate to autonomous vehicle technology and, more particularly, to learning an explainable trajectory generator using an automaton generative network.

Background

Autonomous agents rely on machine vision for sensing a surrounding environment by analyzing areas of interest in a scene from images of the surrounding environment. Although scientists spent decades studying the human visual system, a solution for realizing equivalent machine vision remains elusive, but is a goal for enabling truly autonomous agents. Machine vision, however, is distinct from the field of digital image processing. In particular, machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, quickly evolved and are a reality in this decade. Because autonomous agents interact with humans, however, many critical concerns arise. For example, one critical concern is how to design vehicle control of an autonomous vehicle using machine learning. Unfortunately, vehicle control by machine learning is less effective in complicated traffic environments involving complex interactions between vehicles (e.g., in situations where an ego vehicle maneuvers through roadway traffic and intersections).

A growing fleet of sensor-equipped vehicles on the road and constantly collecting driving data, which makes developing data-driven trajectory planners for autonomous driving applications increasingly attractive. Data-driven planners have the potential to learn complex interactive maneuvers that are otherwise difficult to model. Developing a single objective that fully describes a driving behavior is desired.

SUMMARY

A method of generating an output trajectory of an ego vehicle is described. The method includes extracting high-level features from a bird-view image of a traffic environment of the ego vehicle. The method also includes generating, using an automaton generative network, an automaton including an automaton state distribution describing a behavior of the ego vehicle in the traffic environment according to the high-level features. The method further includes generating the output trajectory of the ego vehicle according to extracted bird-view features of the bird-view image and the automaton state distribution describing the behavior of the ego vehicle in the traffic environment.

A non-transitory computer-readable medium having program code recorded thereon for generating an output trajectory of an ego vehicle is described. The program code is executed by a processor. The non-transitory computer-readable medium includes program code to extract high-level features from a bird-view image of a traffic environment of the ego vehicle. The non-transitory computer-readable medium also includes program code to generate, using an automaton generative network, an automaton including an automaton state distribution describing a behavior of the ego vehicle in the traffic environment according to the high-level features. The non-transitory computer-readable medium further includes program code to generate the output trajectory of the ego vehicle according to extracted bird-view features of the bird-view image and the automaton state distribution describing the behavior of the ego vehicle in the traffic environment.

A system for generating an output trajectory of an ego vehicle is described. The system includes a vehicle perception module to extract high-level features from a bird-view image of a traffic environment of the ego vehicle. The system also includes an automaton generative network to generate an automaton including an automaton state distribution describing a behavior of the ego vehicle in the traffic environment according to the high-level features. The system further includes a trajectory generation module to generate the output trajectory of the ego vehicle according to extracted bird-view features of the bird-view image and the automaton state distribution describing the behavior of the ego vehicle in the traffic environment.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
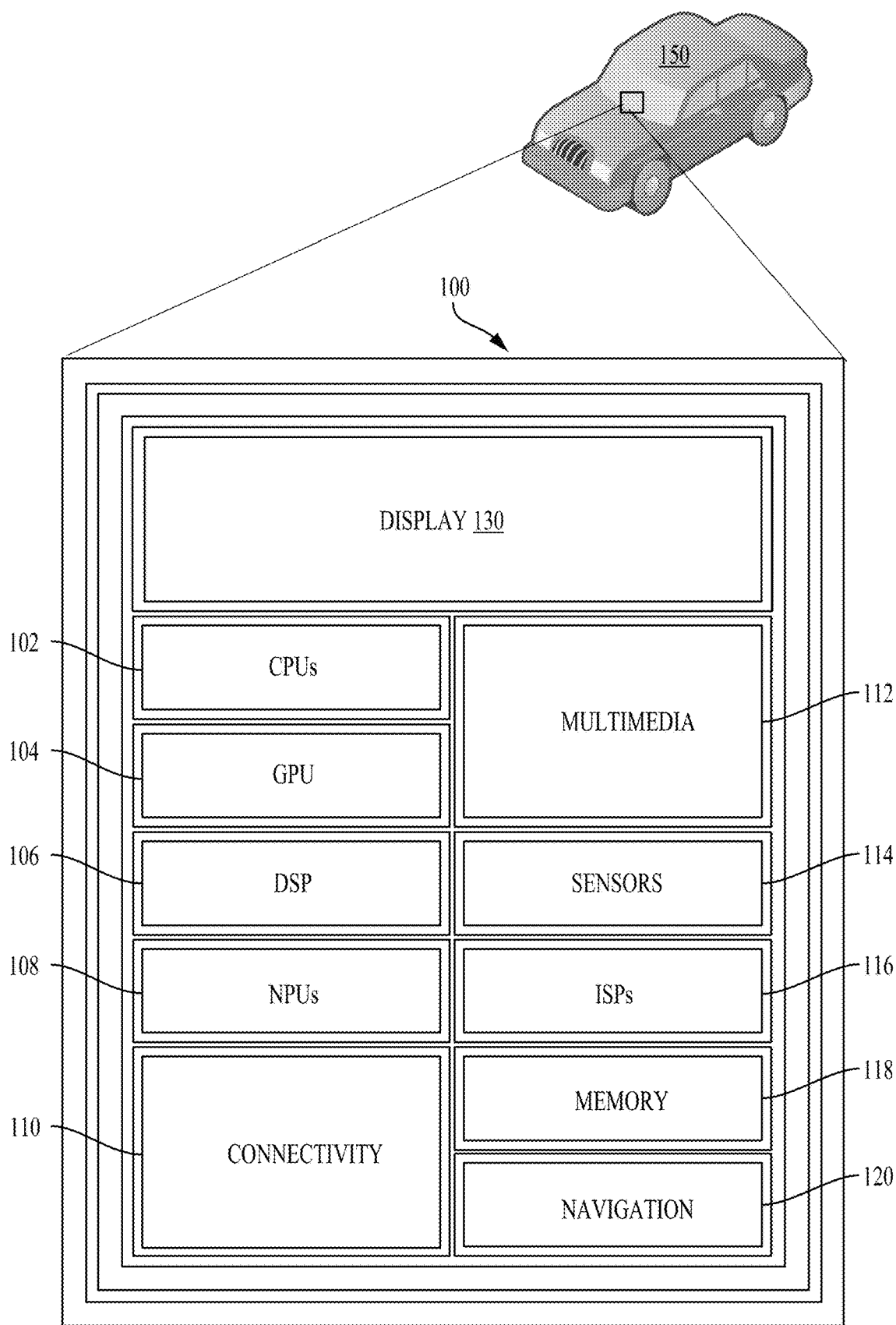
FIG. 1 illustrates an example implementation of designing a neural network using a system-on-a-chip (SOC) for a vehicle trajectory planner system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents, such as driverless cars and robots, quickly evolved and are a reality in this decade. Because autonomous agents interact with humans, however, many critical concerns arise. For example, one critical concern is how to design vehicle control of an autonomous vehicle using machine learning. Unfortunately, vehicle control by machine learning is less effective in complicated traffic environments involving complex interactions between vehicles. For example, an ego vehicle may rely on a data-driven trajectory planner to safely maneuver through complex traffic environments and traffic intersections.

With a growing fleet of sensor-equipped vehicles on the road and constantly collecting driving data, developing data-driven trajectory planners for autonomous driving applications is increasingly attractive. Data-driven planners have the potential to learn complex interactive maneuvers that are otherwise difficult to model. Nevertheless, for safety-critical applications, such as self-driving, exploration of the environment is usually not practical in the real world. Developing a single objective that fully describes a desired driving behavior is difficult.

Developing methods capable of efficiently learning from static datasets can significantly enhance the practicality and performance of data-driven trajectory planners. In particular, deploying a data-driven trajectory planner in an ego vehicle involves understanding a decision-making process of the data-driven trajectory planner. Current state-of-the-art data-driven planners based on deep neural networks are expressive and exhibit versatile behaviors; however these data-driven trajectory planners are expensive and their black-box nature prevents effective analysis of their inter-workings.

In addition, data-driven trajectory planners may rely on symbolic reasoning as a key component to enable autonomous driving. This symbolic reasoning may involve deterministic finite state automata (DFA), which are useful in formalizing an underlying high-level decision-making process. Unfortunately, manual design of an effective DFA is tedious. Nevertheless, a DFA can serve as an effective representation for learning and processing highly complex behavioral patterns when combined with deep learning pipelines.

Aspects of the present disclosure are directed to leveraging the potential of DFA to learn and process highly complex behavioral patterns when combined with deep learning pipelines. These aspects of the present disclosure are directed to an automaton generative network (AGN) configured to provide a differentiable representation of DFA. These aspects of the present disclosure may rely on finite linear temporal logic (FLTL) statements that, for example, may be evaluated over vehicle trajectories and allow for learning the corresponding automata to provide an AGN neural network module. The resulting AGN neural network module can be used as a standalone or as an embedded component within a larger architecture. Evaluation of this AGN neural network module/component on deep learning based autonomous vehicle planning tasks demonstrate that incorporating the AGN improves an ability to explain planning tasks, efficiency, and generality of the AGN neural network module.

Aspects of the invention disclosure are directed to an AGN neural network module that encodes definitions of an automaton and allows bootstrapping from temporal logic formulas and learning from driving data. Although aspects of the present disclosure emphasize the potential of learning from data, taking advantage of the wealth of human knowledge defined for and accumulated from driving is also desired. These aspects of the present disclosure are directed to a structured and expressive solution for incorporating prior knowledge into a learning agent, such that the learning agent avoids starting from scratch. In particular, enforcing these knowledge priors, with various degrees, improves performance assurances of a data-driven trajectory planner.

FIG. 1 illustrates an example implementation of the aforementioned system and method for a vehicle trajectory planner system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include program code to determine one or more merge gaps between vehicles in a target lane of a multilane highway based on images processed by the sensor processor 114. The instructions loaded into a processor (e.g., CPU 102) may also include program code to generate an output trajectory of the ego vehicle according to extracted bird-view features of the bird-view image and the automaton state distribution describing the behavior of the ego vehicle in the traffic environment.

Figure 2:
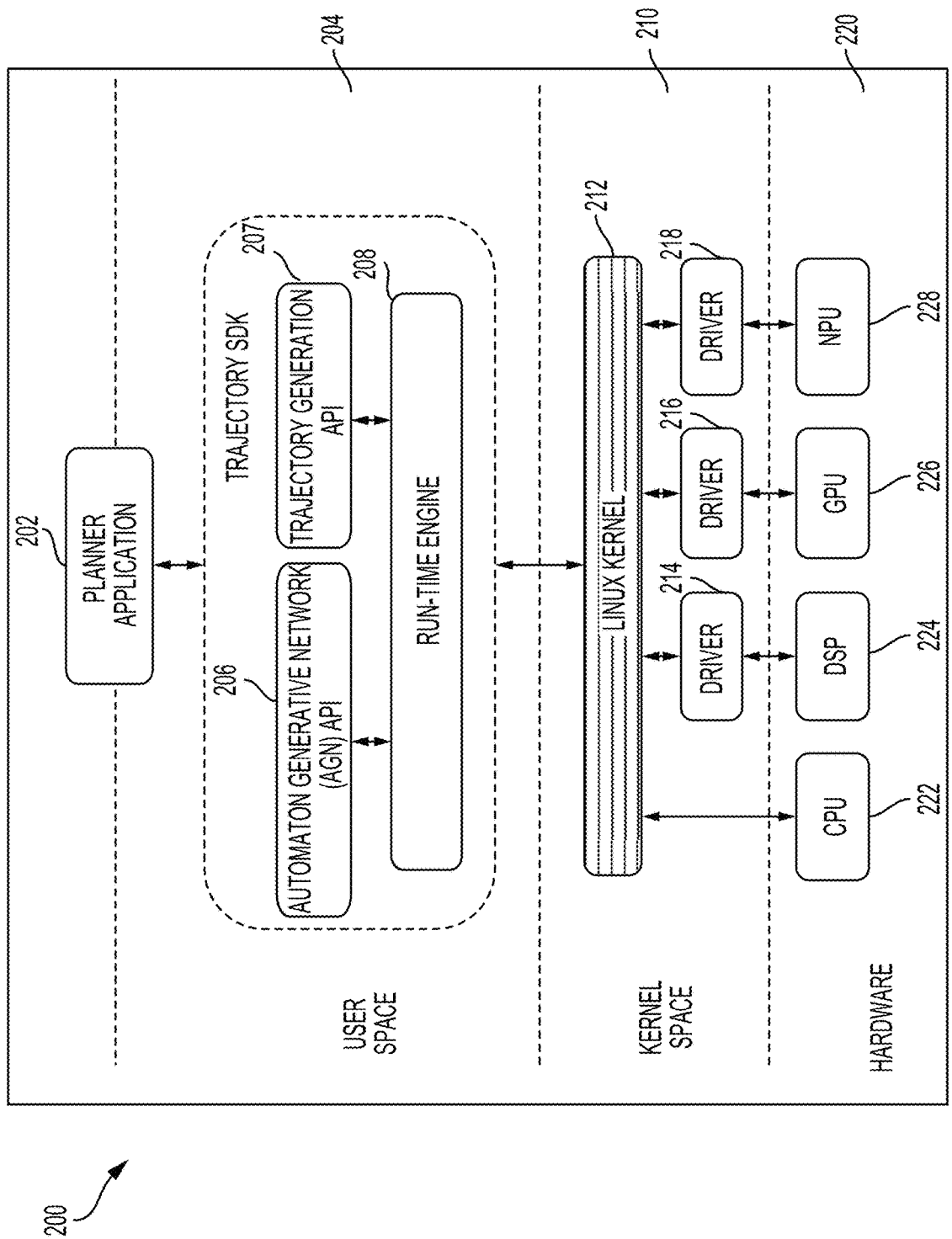
FIG. 2 is a block diagram illustrating a software architecture that may modularize artificial intelligence (AI) functions for a vehicle trajectory planner system of an autonomous agent, according to aspects of the present disclosure.

FIG. 2 is a block diagram illustrating a software architecture 200 that may modularize artificial intelligence (AI) functions for learning an explainable trajectory generator using an automaton generative network, according to aspects of the present disclosure. Using the architecture, a planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the planner application 202. While FIG. 2 describes the software architecture 200 for selecting a vehicle control action of an autonomous agent to perform and follow a selected trajectory, it should be recognized that vehicle action control functionality is not limited to autonomous agents. According to aspects of the present disclosure, vehicle trajectory planning functionality is applicable to any vehicle type, provided the vehicle is equipped with appropriate machine learning functions.

The planner application 202 may be configured to call functions defined in a user space 204 that may, for example, provide vehicle trajectory planning services. The planner application 202 may request to compile program code associated with a library defined in an automaton generative network (AGN) application programming interface (API) 206. In these aspects of the present disclosure, the AGN API 206 generates an automaton including an automaton state distribution describing a behavior of an ego vehicle in a traffic environment. For example, the automaton is generated according to high-level features extracted from a bird-view of the traffic environment of the ego vehicle. Generation of the automaton may ultimately rely on the output of a convolutional neural network configured to generate the automaton including the automaton state distribution describing the behavior of the ego vehicle in the traffic environment.

The planner application 202 may request to compile program code associated with a library defined in a trajectory generation API 207. In these aspects of the present disclosure, the trajectory generation API 207 generates an output trajectory of the ego vehicle according to extracted bird-view features of the bird-view image and the automaton state distribution describing the behavior of the ego vehicle in the traffic environment. Generation of the output trajectory of the ego vehicle may ultimately rely on the automaton output of a convolutional neural network configured to generate the automaton, including the automaton state distribution describing the behavior of the ego vehicle in the traffic environment.

A run-time engine 208, which may be compiled code of a runtime framework, may be further accessible to the planner application 202. The planner application 202 may cause the run-time engine 208, for example, to take actions for controlling the autonomous agent. When an ego vehicle enters a traffic environment, the run-time engine 208 may in turn send a signal to an operating system 210, such as a Linux Kernel 212, running on the SOC 220. FIG. 2 illustrates the Linux Kernel 212 as software architecture for implementing trajectory planning of an autonomous agent using an automaton generative network. It should be recognized, however, aspects of the present disclosure are not limited to this exemplary software architecture. For example, other kernels may be used to provide the software architecture to support vehicle planning trajectory selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
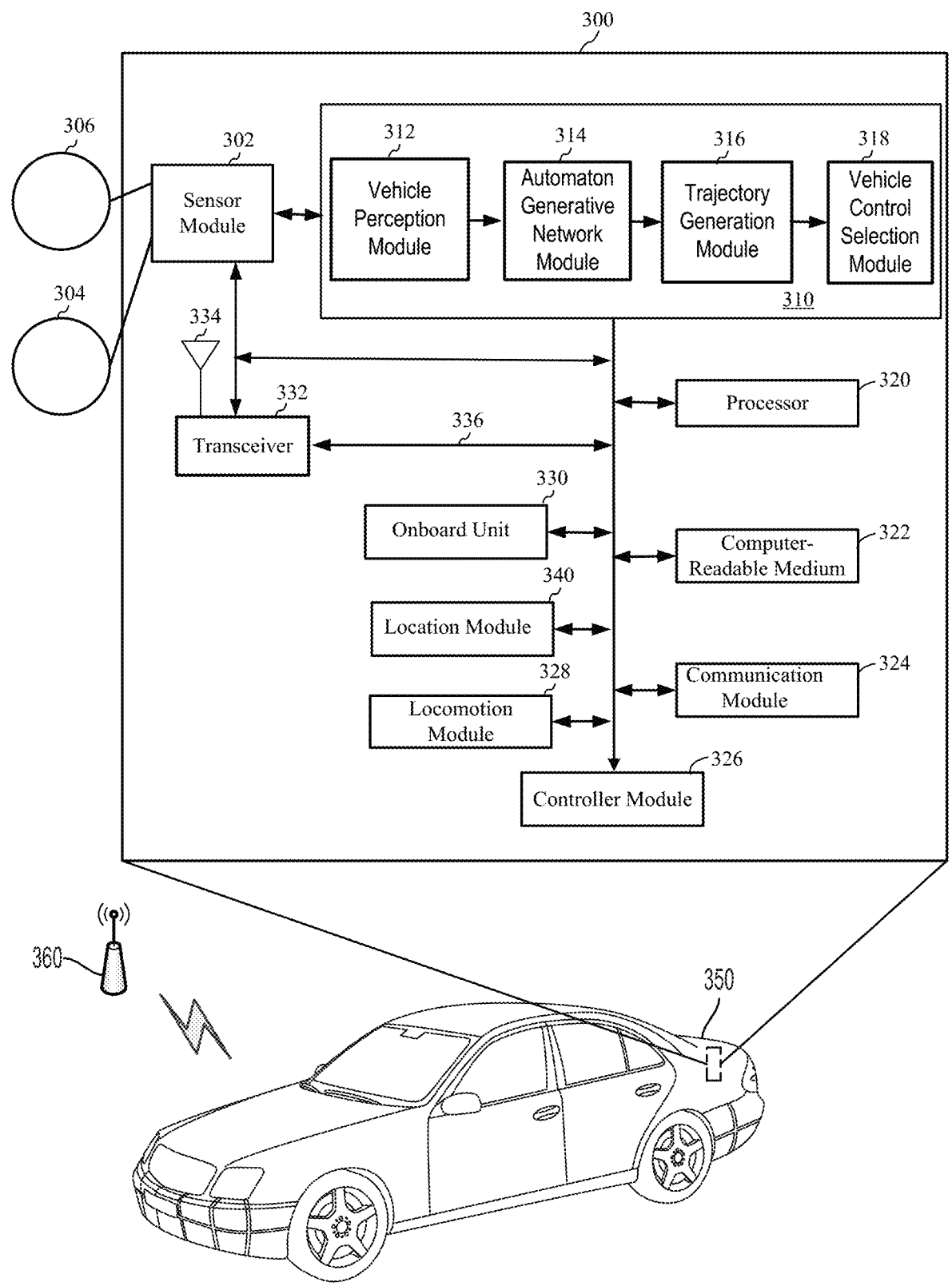
FIG. 3 is a diagram illustrating an example of a hardware implementation for a vehicle trajectory planner system, according to aspects of the present disclosure.

FIG. 3 is a diagram illustrating an example of a hardware implementation for a vehicle trajectory planner system 300, according to aspects of the present disclosure. The vehicle trajectory planner system 300 may be configured for improved trajectory planning for an ego vehicle. The vehicle trajectory planner system 300 may be a component of a vehicle, a robotic device, or other autonomous device (e.g., autonomous vehicles, ride-share cars, etc.). For example, as shown in FIG. 3, the vehicle trajectory planner system 300 is a component of a car 350.

Aspects of the present disclosure are not limited to the vehicle trajectory planner system 300 being a component of the car 350. Other devices, such as a bus, motorcycle, or other like autonomous vehicle, are also contemplated for implementing the vehicle trajectory planner system 300. In this example, the car 350 may be autonomous or semi-autonomous; however, other configurations for the car 350 are contemplated, such as an advanced driver assistance system (ADAS).

The vehicle trajectory planner system 300 may be implemented with an interconnected architecture, represented generally by an interconnect 336. The interconnect 336 may include any number of point-to-point interconnects, buses, and/or bridges depending on the specific application of the vehicle trajectory planner system 300 and the overall design constraints. The interconnect 336 links together various circuits including one or more processors and/or hardware modules, represented by a sensor module 302, a vehicle trajectory planner 310, a processor 320, a computer-readable medium 322, a communication module 324, a controller module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle trajectory planner system 300 includes a transceiver 332 coupled to the sensor module 302, the vehicle trajectory planner 310, the processor 320, the computer-readable medium 322, the communication module 324, the controller module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle trajectory planner 310 to/from connected vehicles within the vicinity of the car 350.

The vehicle trajectory planner system 300 includes the processor 320 coupled to the computer-readable medium 322. The processor 320 performs processing, including the execution of software stored on the computer-readable medium 322 to provide vehicle trajectory planning functionality according to the disclosure. The software, when executed by the processor 320, causes the vehicle trajectory planner system 300 to perform the various functions described for vehicle behavior planning (e.g., vehicle trajectory selection) of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle trajectory planner 310, the communication module 324, the controller module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the vehicle trajectory planner system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle trajectory planner system 300 also includes the controller module 326 for planning a route and controlling the locomotion of the car 350, via the locomotion module 328 for autonomous operation of the car 350. In one configuration, the controller module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle trajectory planner 310 may be in communication with the sensor module 302, the processor 320, the computer-readable medium 322, the communication module 324, the controller module 326, the locomotion module 328, the location module 340, the onboard unit 330, and the transceiver 332. In one configuration, the vehicle trajectory planner 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle trajectory planner 310 may receive sensor data directly from the first sensor 306 and the second sensor 304 to determine, for example, input traffic data images.

With a growing fleet of sensor-equipped vehicles on the road and constantly collecting driving data, developing data-driven trajectory planners for autonomous driving applications, such as the car 350, is increasingly attractive. Data-driven planners have the potential to learn complex interactive maneuvers that are otherwise difficult to model. Nevertheless, for safety-critical applications such as self-driving of the car 350, exploration of the environment is usually not practical in the real world. Developing a single objective that fully describes a desired behavior of the car 350 is difficult.

Developing methods capable of efficiently learning from static datasets can significantly enhance the practicality and performance of data-driven trajectory planners for autonomous vehicles, such as the car 350. In particular, deploying a data-driven trajectory planner in an ego vehicle (e.g., the car 350) involves understanding a decision-making process of the data-driven trajectory planner. Current state-of-the-art data-driven trajectory planners (e.g., based on deep neural networks) are expressive and exhibit versatile behaviors; however, these data-driven trajectory planners are expensive and their black-box nature prevents effective analysis of their inter-workings.

In addition, data-driven trajectory planners may rely on symbolic reasoning as a key component to enable autonomous driving of the car 350. For example, this symbolic reasoning may involve deterministic finite state automata (DFA), which are useful in formalizing an underlying high-level decision-making process, such as the behavior of the car 350. Unfortunately, manual design of an effective DFA is tedious. Nevertheless, a DFA can serve as an effective representation to learn and process highly complex behavioral patterns of the data-driven trajectory planner of the car 350 when combined with deep learning pipelines.

Aspects of the present disclosure are directed to leveraging the potential of DFA to learn and process highly complex behavioral patterns when combined with deep learning pipelines. These aspects of the present disclosure are directed to an automaton generative network (AGN) configured to provide a differentiable representation of DFA. These aspects of the present disclosure may rely on finite linear temporal logic (FLTL) statements that are evaluated over vehicle trajectories and allow for learning the corresponding automata to provide an AGN neural network module. The resulting AGN neural network module can be used as a standalone or as an embedded component within a larger architecture. Evaluation of this AGN neural network module/component on deep learning based autonomous vehicle planning tasks demonstrate that incorporating the AGN improves an ability to explain planning tasks, efficiency, and generality of the AGN neural network module.

Aspects of the present disclosure are directed to an AGN neural network module that encodes definitions of an automaton and further allows for bootstrapping from temporal logic formulas and learning from driving data. Although aspects of the present disclosure emphasize the potential of learning from data, taking advantage of the wealth of human knowledge, defined for and accumulated from driving, is also desired. These aspects of the present disclosure are directed to a structured and expressive process of incorporating prior knowledge into a learning agent, such that the learning agent avoids starting from scratch. In particular, enforcing these knowledge priors, in various degrees, improves performance assurances of the data-driven trajectory planner.

As shown in FIG. 3, the vehicle trajectory planner 310 includes a vehicle perception module 312, an automaton generative network module 314, a trajectory generation module 316, and a vehicle control selection module 318. The vehicle perception module 312, the automaton generative network module 314, the trajectory generation module 316, and the vehicle control selection module 318 may be components of a same or different artificial neural network, such as a deep convolutional neural network (CNN). The vehicle trajectory planner 310 is not limited to a CNN. The vehicle trajectory planner 310 receives a data stream from the first sensor 306 and/or the second sensor 304. The data stream may include a 2D RGB image from the first sensor 306 and LIDAR data points from the second sensor 304. The data stream may include multiple frames, such as image frames of traffic data.

The automaton generative network module 314 may be configured to generate automaton state distribution describing the behavior of the car 350 according to a bird-view image of a traffic environment of the car 350. In these aspects of the present disclosure, the trajectory generation module 316 is configured to generate an output trajectory of the car 350 according to extracted bird-view features of the bird-view image and the automaton state distribution describing the behavior of the ego vehicle in the traffic environment. Once the output trajectory of the car 350 is generated, a vehicle behavior of the car 350 may be controlled by the vehicle trajectory planner 310 in a manner for motion planning and maneuvering of the car 350 by using the output trajectory to perform a driving maneuver, for example, as shown in FIG. 4.

Figure 4:
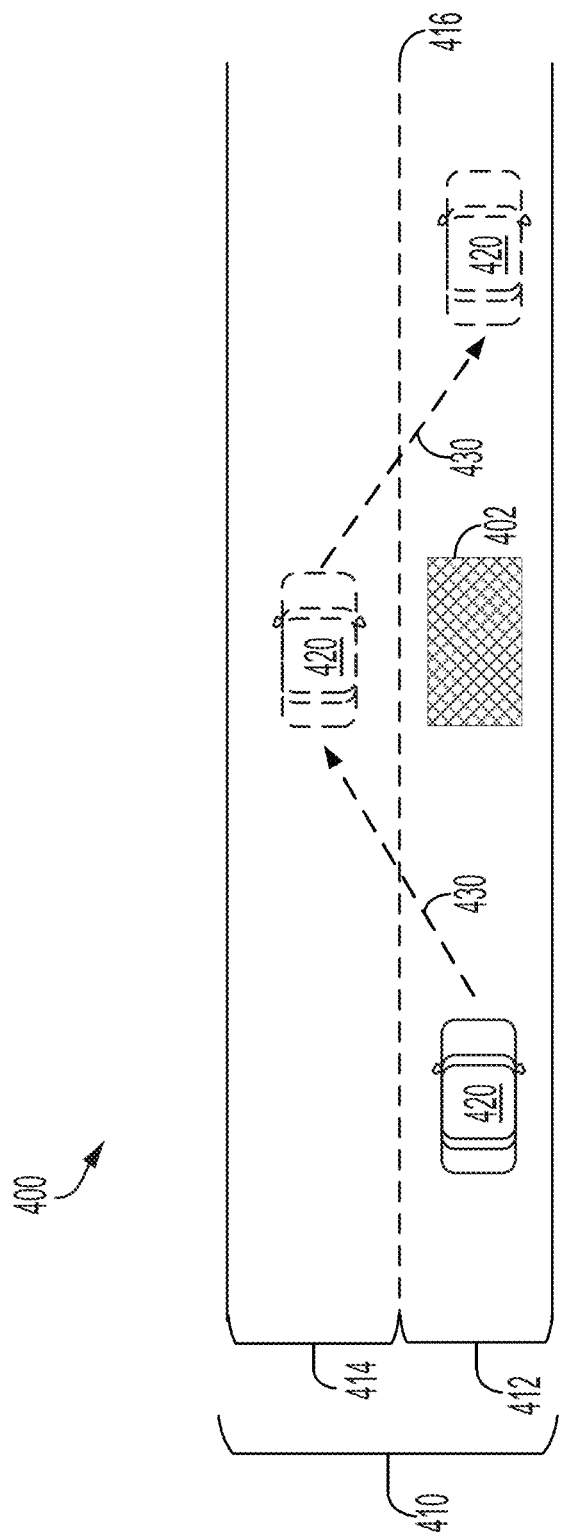
FIG. 4 is a diagram illustrating an overview of a roadway environment, including an ego vehicle having a data driven trajectory planner, according to aspects of the present disclosure.

FIG. 4 is a diagram illustrating an overview of a roadway environment, including an ego vehicle having a data-driven trajectory planner, according to aspects of the present disclosure. In this example, a roadway environment 400 includes a roadway 410, having a first lane 412 in which an ego vehicle 420 is traveling in a second lane 414. In addition, the first lane 412 also includes an obstruction 402. In this example, the ego vehicle 420 is configured to monitor the dynamics of both vehicles/obstructions in the first lane 412, as well as vehicles/obstructions in the second lane 414 of the roadway 410. In this example, the ego vehicle 420, may be the car 350, shown in FIG. 3.

In one aspect of the present disclosure, maneuvering of the ego vehicle 420 is essentially controlled by a vehicle planner (e.g., the vehicle trajectory planner 310 of FIG. 3). In this example, the ego vehicle 420 (e.g., the vehicle perception module 312 of FIG. 3) identifies the obstruction 402 in the first lane 412 of the roadway 410. That is, the ego vehicle 420 is configured to identify a driving trajectory for avoiding the obstruction 402 in the first lane 412 of the roadway 410. According to aspects of the present disclosure, the ego vehicle 420 is configured to identify a trajectory for a driving maneuver performed by the ego vehicle 420 to avoid the obstruction 402 in the first lane 412.

In some aspects of the present disclosure, the ego vehicle 420 is deployed using a data-driven trajectory planner. Deploying a data-driven trajectory planner in the ego vehicle 420 involves understanding a decision-making process of the data-driven trajectory planner. Current state-of-the-art data-driven trajectory planners based on deep neural networks are expressive and exhibit versatile behaviors; however, a black-box nature of these data-driven trajectory planners prevents effective analysis of their inter-workings. Aspects of the present disclosure are directed to leveraging the potential of deterministic finite state automata (DFA) to learn and process highly complex behavioral patterns when combined with deep learning pipelines. These aspects of the present disclosure are directed to an automaton generative network (AGN) configured to provide a differentiable representation of DFA, as follows.

As described, finite linear temporal logic (FLTL) formulas are constructed from a set of atomic propositions Π. For example, the set of atomic propositions Π are Boolean valued expressions, connected by the following Boolean operators: ¬ (negation), $\wedge$ (conjunction), and $\vee$ (disjunction), and temporal operators $\mathcal{X}$ (next), $\mathcal{U}$ (until), $\mathcal{F}$ (eventually) and $\mathcal{G}$ (always). In this example, the semantics of the FLTL formulas are defined over finite words (also referred to as executions) $\sigma = \sigma_0 \sigma_1 \ldots \sigma_N$, where $\sigma_i \in 2^\Pi$ for all $i \in \{0, \ldots, N\}$, and $2^\Pi$ is the powerset of Π. A word σ satisfying FLTL φ is denoted by σ⊨φ. The language of a formula φ is the set of all finite words that satisfy the formula φ, and denoted by $\mathcal{L}(\phi)$. In aspects of the present disclosure, the FLTL formula φ is defined over finite executions.

Deterministic Finite State Automaton (DFA): The formal definition of DFA is defined as follows:

Definition 1. A deterministic finite state automaton is a tuple $\mathcal{A} = (Q, q_{init}, \Sigma, \delta, F)$, where:

$Q$ is a finite set of states;
$q_{init} \in Q$ is the initial state;
Σ is the input alphabet;
δ:Q×Σ→Q is the transition function;
F⊆Q is the set of accepting states;

A trajectory of $\mathcal{A} q_0 q_1 \ldots q_N$ is generated by a finite sequence of symbols (word) $\sigma = \sigma_0 \sigma_1 \ldots \sigma_{N-1}$, $\sigma_k \in \Sigma$, if $q_0 = q_{init}$ and $q_{k+1} = \delta(q_k, \sigma_k)$ for all k≥0. A finite input word σ over Σ is said to be accepted by $\mathcal{A}$ if σ generates a trajectory q of $\mathcal{A}$ such that the terminal state is accepting, i.e., $q_N \in F$. The set of input symbols g(q, q') of all transitions between states q, q' is the guard of the transition, i.e., $g(q, q')=\{\sigma|q'=\delta(q, \sigma)\}$. Guards are commonly represented as Boolean formulas. The set of all accepted input words is the language of $\mathcal{A}$, and is denoted by $\mathcal{L}(\mathcal{A})$.

For every FLTL formula ϕ over Π there exists a DFA $\mathcal{A}$ over input alphabet $\Sigma=2^\Pi$ such that ϕ and $\mathcal{A}$ are language equivalent, i.e., $\mathcal{L}(\phi)=\mathcal{L}(\mathcal{A})$. The size of a DFA is exponential in the size of the FLTL formula (e.g., in the worst case). In practice, problems can often be resolved using DFAs of manageable size. Off-the-shelf tools are available to translate FLTL formulas into DFAs.

Figure 5B:
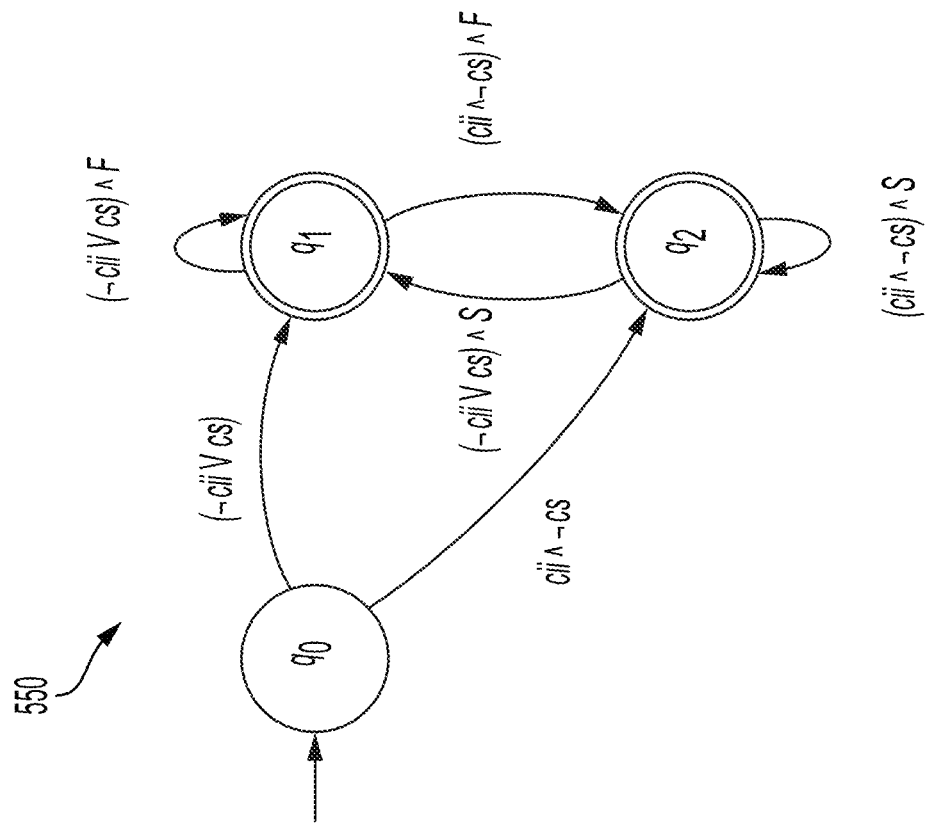
FIGS. 5A and 5B illustrate a simulated environment of an ego vehicle entering an unprotected intersection and an associated deterministic finite state automaton (DFA) defining a behavior of the ego vehicle, according to aspects of the present disclosure.
Figure 5A:
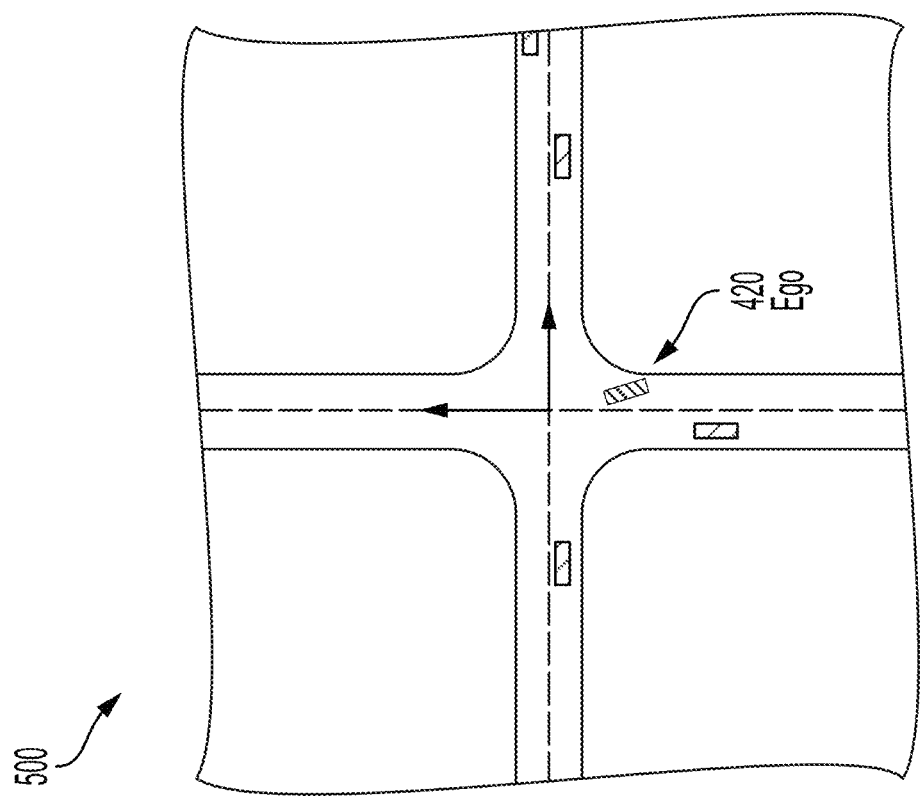

FIGS. 5A and 5B illustrate a simulated environment of an ego vehicle entering an unprotected intersection and an associated deterministic finite state automaton (DFA) defining a behavior of the ego vehicle, according to aspects of the present disclosure. In this example (Example 1) the ego vehicle 420 is approaching an unprotected intersection 500. Taking an excerpt from the California driver handbook: "at an intersection without STOP or YIELD signs, yield to traffic already in the intersection." In this example, the ego vehicle 420 is navigating through an unprotected intersection and should follow the rule "yield to traffic already in the intersection." This rule may be translated into the FLTL formula according to Equation (1) as follows.

First, four propositions Π are defined: cii denotes whether there is a car in the intersection; cs denotes whether that car has stopped (sometimes vehicles in the intersection may stop for the ego); F (faster) denotes the vehicle speeding up; S (slower) denotes the vehicle slowing down. The FLTL formula over the four propositions Π expressing the above rule is provided in Equation (1):

$$\phi = \mathcal{G}((\text{cii} \wedge \neg \text{cs}) \rightarrow \mathcal{X} \, \mathcal{S}) \wedge \mathcal{G}((\neg \text{cii} \vee \text{cs}) \rightarrow \mathcal{X} \, \mathcal{F}) \quad (1)$$

which reads "always car in intersection and not car stopped implies next ego slow down, and always not car in intersection or car stopped implies next ego speed up." In this example, the FLTL formula ϕ of Equation (1) is translated into a DFA 550 depicted in FIG. 5B. In the DFA 550, $q_0$ is an initial state, and $q_1$ and $q_2$ are both accepting states.

I. Automaton Generative Network (AGN)

In some aspects of the present disclosure, an automaton generative network (AGN) encodes the definition of the DFA 550 into a differentiable structure whose transition function (e.g., edges and guards) are learned. In these aspects of the present disclosure, the number of nodes of the DFA 550 is preset and is a hyper-parameter.

A. Predicate FLTL ($\text{FLTL}_p$) and DFA ($\mathcal{A}_p$)

In this example according to Definition 1, the DFA 550 operates over sets of atomic proposition that take binary values. To enable an AGN to learn from continuous data, definitions of the FLTL and the DFA 550 are modified. In these aspects of the present disclosure, the definitions of the FLTL and the DFA 550 are modified to use predicates instead of propositions. These aspects of the present disclosure use predicates of the form $p(s):f^p(s)<c$, where s is a continuous state, c is a constant, and $f^p$ is a real-valued function over s.

In Example 1, the predicate for cs is defined as $|v|<\epsilon$, where the state s=v is the velocity and ϵ is a threshold. The predicate is true if and only if (iff) $c - f^p(s) > 0$ (e.g., similar to a robustness degree in signal temporal logic (STL)). As described, aspects of the present disclosure refer to FLTL formulas over predicates as Predicate Finite Linear Temporal Logic ($\text{FLTL}_p$) formulas. The syntax and Boolean semantics of the FLTL carry over to $\text{FLTL}_p$. Because we are using predicates, aspects of the present disclosure calculate the robustness of an $\text{FLTL}_p$ formula.

FIG. 5B illustrates the DFA 550 defining a behavior of the ego vehicle 420, according to aspects of the present disclosure. In this example, the ego vehicle 420 is navigating through an unprotected intersection and should follow the rule "yield to traffic already in the intersection." This rule in translated into the FLTL formula of Equation (1). Aspects of the present disclosure modify a transition function δ of the DFA 550 for allowing the DFA 550 to transition on continuous system states (e.g., vehicle position, velocity).

In Definition 1, a transition between two automaton states occur if the formula guarding their edge evaluates to true. For example, in FIG. 5B, the $q_0$ state transitions to the $q_1$ state if $\neg$ cii $\vee$ cs evaluates to true. Because aspects of the present disclosure involve predicates instead of propositions, the guards of the DFA 550 are redefined as predicate Boolean formulas (e.g., predicates connected by Boolean operators). As described, the predicate Boolean guard formula governing the transition from the $q_i$ state to the $q_j$ state is denoted by $b(q_i, q_j)$.

Aspects of the present disclosure define the robustness of a predicate guard. For example, given two predicates $p_1(s):f^{p_1}(s)<c_1$ and $p_2(s):f^{p_2}(s)<c_2$, the robustness degree of predicate guards is defined recursively as:

$$r(s,p) = c - f^p(s)$$

$$r(s,\neg p) = -r(s,p(s))$$

$$r(s, p_1 \wedge p_2) = \min(r(s, p_1), r(s, p_2))$$

$$r(s, p_1 \vee p_2) = \max(r(s, p_1), r(s, p_2)). \quad (2)$$

In this example, a predicate guard is true at state s if and only if (iff) a robustness degree of the predicate guard is greater than zero at s. The predicate transition function $\delta_p$ is defined such that the qi state transitions to the qj state at s iff $r(s, b(q_1, q_j)) > 0$. As described, the DFA 550 defined over predicates with the transition function $\delta_p$ is referred to as the predicate DFA $\mathcal{A}_p$.

B. Constructing an AGN

To construct a differentiable representation of the predicate DFA, a representation of a predicate DFA is first described. Given a set of predicates $P=\{p_i | i \in [0, n)\}$, an alphabet of the automaton is constructed as a powerset of P, e.g., $\Sigma = 2^P$. In this example, each symbol $\sigma \in \Sigma$ is a conjunctive predicate Boolean formula over the predicates in P. Let $L:Q \times \Sigma \times Q \rightarrow \{0,1\}$ be a labeling function with $L(q_i, \sigma_k, q_j)=1$ indicating that $\sigma_k$ constitutes as a component guarding the transition from $q_i$ to $q_j$. The guard of $(q_1, q_j)$ in Boolean formula form is:

$$b(q_i, q_j) = \bigvee_{k \in [0,n)} L(q_i, \sigma_k, q_j) \sigma_k. \quad (3)$$

Here the multiplication between an integer and formula σ is loosely defined such that 1·σ represents existence and 0·σ represents absence in $b(q_i, q_j)$.

Figure 6:
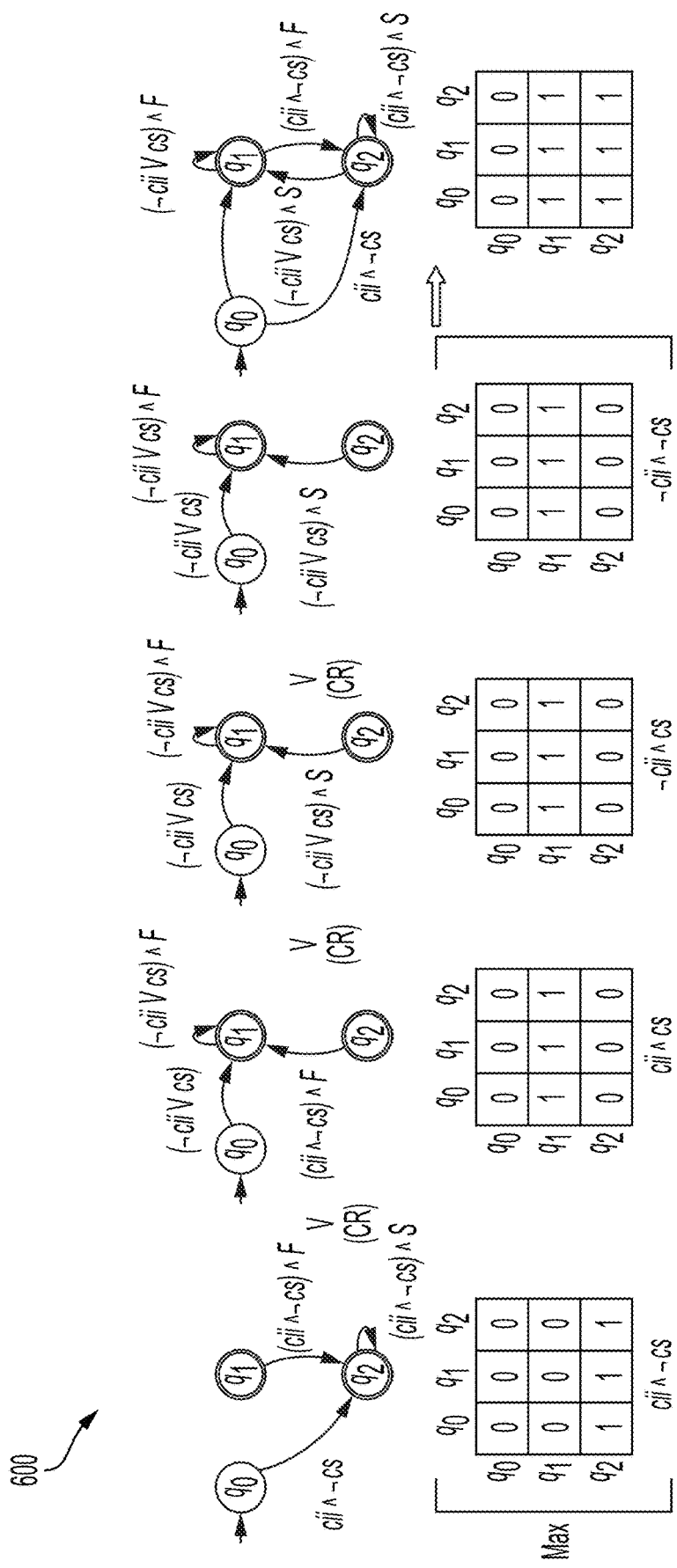
FIG. 6 illustrates an automaton construction process, according to aspects of the present disclosure.

FIG. 6 illustrates an automaton construction process, according to aspects of the present disclosure. In this example (Example 2) an automaton construction process is described with the predicate set $P=\{\text{cii}, \text{cs}\}$. The alphabet is $\Sigma = \{\text{cii} \wedge \neg \text{cs}, \text{cii} \wedge \text{cs}, \neg \text{cii} \wedge \text{cs}, \neg \text{cii} \wedge \neg \text{cs}\}$ that contains all possible combinations of cii and cs and their negations.

For each σ ∈ Σ, a sub-automaton is constructed that contains edges that only σ has influence on. The final automaton is obtained by applying Equation (3) to all edges among the sub-automata. It is noted that in FIG. 6, the entries in the matrices represent the labeling function L, where column and row indices represent source and target automaton states, respectively. They can be interpreted as adjacency matrices. Also, for all edges with target state $q_1$, yields ¬cii ∨ cs=(cii ∧cs)∨(¬cii ∧cs)∨(¬cii ∧¬cs) as a shorthand.

Figures 7A, 7B:
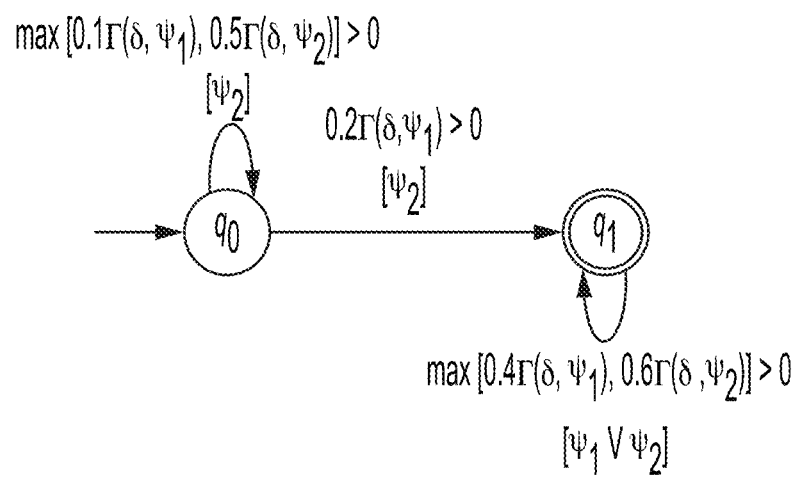
FIGS. 7A and 7B are diagrams illustrating reconstruction of a predicate deterministic finite state automaton (DFA) as an $A_p$, according to aspects of the present disclosure.

As described in the previous section, transition between nodes qi and qj within the predicated DFA $\mathcal{A}_p$ is governed by the robustness $r(s, b(q_i, q_j))$, for example, as shown in FIGS. 7A and 7B. Plugging Equation (3) into the robustness definition in Equation (2) results in $$r(s, b(q_i, q_j)) = \max_{k \in [0,n)} L(q_i, \sigma_k, q_j) r(s, \sigma_k) \quad (4)$$

In view of the above features, an AGN is introduced as follows. Given the set of predicates P and the number of automaton nodes N, the current automaton state $q_t \in \mathbb{R}^N$ is represented as an N-vector with each entry corresponding to the probability of being in $q_i$. In addition, an alphabet vector $v^\Sigma$ with elements $v^\sigma = r(s, \sigma)$, σ ∈ Σ, is construct, where r is the robustness degree with Equation (2). A matrix is defined as:

$$W^\Sigma = \text{sigmoid}(W^\mathcal{L}) \quad (5)$$

where $W^\mathcal{L}$ is a matrix of size |Σ|×N×N that contains learned weights. |Σ| is the cardinality of set Σ. An element $w_{k,i,j}^\sigma$ of $W^\Sigma$ determines how strong an influence $\sigma_k$ has on the transition from $q_i$ to $q_j$. Define an N×N robustness matrix R such that each element $r_{ij} \in R$ is calculated from $$r_{ij} = \max_{k \in [0,n)} w_{k,i,j}^T v_k^T = \max_{k \in [0,n)} w_{k,i,j}^T r(s, \sigma_k) \quad (6)$$

Equation (6) is a scaled version of Equation (4). In these aspects of the present disclosure, a rectified linear unit (ReLU) activation of R is applied to obtain the edges that are activated with a robustness greater than zero. Finally, a transition from $q_t$ to $q_{t+1}$ is achieved by:

$$q_{t+1} = \text{softmax}(\text{ReLU}(R) \cdot q_t). \quad (7)$$

In order for the AGN to have well defined gradients, all max(·)functions in the equations above are replaced with softmax(·). Given the alphabet vector $v^\Sigma$ as input, the AGN functions like a transition system (e.g., a state machine), and can be trained recurrently similar to a recurrent neural network.

Figure 8:
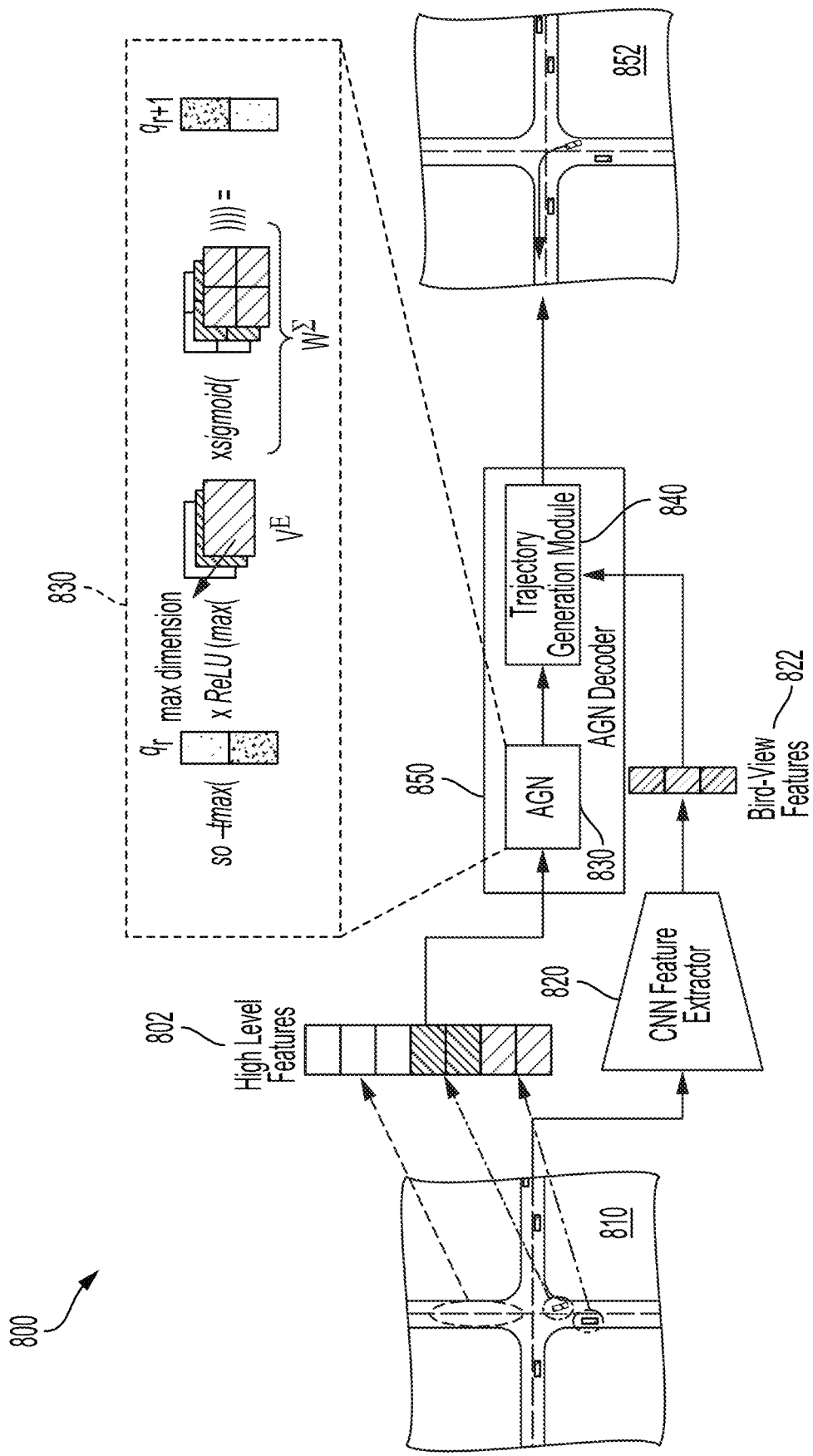
FIG. 8 shows a schematic of a vehicle trajectory planner system having an automaton generative network (AGN) within a trajectory generator, according to aspects of the present disclosure.

FIG. 8 shows a schematic of a vehicle trajectory planner system 800 having an automaton generative network (AGN) within an AGN decoder to generate an output trajectory, according to aspects of the present disclosure. In this vehicle trajectory planner system 800, high level features 802 (e.g., agent positions, velocities, lane representations, etc.) serve as states used to calculate the alphabet vector $v^\Sigma$ by the AGN 830. In this example, a bird-view image 810 is also passed through a CNN feature extractor 820 to obtain bird-view features 822 (e.g., high-level features) that are provided as an input to a trajectory generation module 840 of the AGN decoder 850. In these aspects of the present disclosure, the AGN 830 outputs an automaton state distribution as input to the trajectory generation module 840 along with the bird-view features 822 for generating an output trajectory 852.

A design of the trajectory generation module 840 may be a simple or more complex configuration. For example, the AGN decoder 850 may be configured using a long short-term memory (LSTM). In another configuration, the trajectory generation module 840 is configured using an LSTM followed by a lane kinematics model).

According to aspects of the present disclosure, the AGN decoder 850 is used and trained recursively, similar to a recurrent network.

| Algorithm 1 Learning an AGN trajectory generator |
|---|
| 1: Inputs: number of AGN nodes N; the set of predicates P; dataset X; number of iterations I; future trajectory length T; trajectory generator module TG; learning rate α |
| 2:   $\theta^{AGN} \leftarrow$ InitializationAGN(N)    ▷ using Equations (5)-(??) |
| 3:   $\theta^{TG} \leftarrow \theta_0^{TG}$    ▷ Initialize to received LLRs |
| 4:   for i = 0 . . . I − 1 do |
| 5:     Sample a mini-batch of m data samples $(x_0, y_0)$, $y_{1:T}$ ▷ 0 is the current time-step |
| 6:     $\hat{y} \leftarrow [y_0]$    ▷ initialize generated trajectory with $y_0$ |
| 7:     f = Feature Extractor($x_0$) |
| 8:     for t = 0 . . . T − 1 do |
| 9:       $v_t^\Sigma$ = AlphabetVector($x_0$, $\hat{y}[t]$) |
| 10:       $q_{t+1}$ = AGN($q_t$, $v_t^\Sigma$)    ▷ Equation (7) |
| 11:       $\hat{y}_{t+1}$ = TrajectoryGenerator($q_{t+1}$, f) |
| 12:       $\hat{y}$.append($q_{t+1}$) |
| 13:     end for |
| 14:     L = MSE($y_{1:T}$, $\hat{y}$) |
| 15:     $\left(\theta^{AGN}, \theta^{TG}\right) \leftarrow \left(\theta^{AGN}, \theta^{TG}\right) - \alpha \frac{1}{m} \nabla L$ |
| 16:   end for |

Algorithm 1 describes the process of learning the trajectory generation module 840 of the AGN decoder 850, according to aspects of the present disclosure. On line 2, $\theta^{AGN} = W^\mathcal{L}$ The samples on line 5 consist of $x_0$—inputs at the current timestep (i.e., bird-view image, agent poses, velocities, etc.); $y_0$—ego vehicle's current positions; $y_{1:T}$—ego vehicle's target future trajectory.

C. The Predicate DFA Corresponding To A Learned AGN

FIGS. 7A and 7B are diagrams illustrating reconstruction of a predicate DFA ($\mathcal{A}_p$), according to aspects of the present disclosure. Having learned the matrix $W^\Sigma$, the corresponding predicate DFA $\mathcal{A}_p$ is reconstructed. FIG. 7A shows a simple example $W^\Sigma$ matrix, and FIG. 7B shows the reconstructed predicate DFA $\mathcal{A}_p$. The inequality expression on each edge governs the corresponding transition and is constructed from $W^\Sigma$ using Equation (6). To compute the predicate guards, a threshold η is set, where $\sigma_k$ exists on edge $(q_i, q_j)$ if $w_{k,i,j}^\Sigma > \eta$. In FIG. 7B, the predicate Boolean formula in square brackets are computed with η=0.15. If the dataset contains only positive examples (e.g., expert data), the accepting automaton states are recovered by simply computing the DFA state trajectory $q_0, \ldots, q_n$ corresponding to each trajectory in the dataset, and setting $q_n$ as an accepting state (e.g., Definition 1).

The above-noted description is based on the assumption that all trajectories in the dataset are accepted by the automaton. In its current state, the AGN 830 does not explicitly use accepting states to affect the model's behavior.

D. Using Logic Priors with AGN

As shown in Example 1, knowledge regarding the task domain is often available and may aid in bootstrapping the learning process, according to aspects of the present disclosure. When these priors can be represented by either a logic formula or as a transition system, various method are available to combine this prior information with the AGN 830 of FIG. 8. In the case of a logic formula, a robustness value may be used as an auxiliary loss (e.g., total loss=imitation loss−(coefficient×robustness)). Because robustness measures how well a trajectory satisfies a temporal logic formula, the model is forced to strike balance between imitating the data and satisfying the logic constraints. In scenarios in which a transition system is known a priori (or the automaton corresponding to a logic formula), the weights (or a subset of the weights) of AGN 830 are initialized with those of the transition system. Both methods are evaluated, as described below.

Referring again to FIGS. 5A and 5B, a highway environment is used as a simulator to construct a synthetic dataset, according to aspects of the present disclosure. In the highway environment depicted in FIG. 5A, the task is to safely navigate the ego vehicle 420 through the unprotected intersection 500, as described in Example 1. When constructing the synthetic dataset, the ego vehicle 420 is controlled using the ground truth automaton of the DFA 550 of FIG. 5B to output a longitudinal velocity that is passed to a low-level controller that governs the motion of the ego vehicle 420. In aspects of the present disclosure, the highway environment of FIG. 5A is provided to determine whether a ground truth automaton is recoverable from the synthetic dataset and to analyze the characteristics of the learned automaton.

A real-world driving dataset may be used for training and evaluation. For example, this real-world driving dataset contains a multitude of scenes each collected, for example, in the US and Asia. This real-world driving dataset also includes rich semantic information including various object classes (e.g., pedestrian, vehicle, etc.) and high-definition (HD) maps with a number of annotated layers (e.g., lanes, walkways, etc.). Since this real-world driving dataset does not provide a ground truth automaton, some aspects of the present disclosure are directed to establishing that the AGN 830 is capable of learning an explainable representation that can guide the ego vehicle 420 by generating efficient and safe trajectories. In addition, this real-world driving dataset is used to investigate different use of logic priors.

Various method are provided for evaluating a capability of the AGN 830 to learn an explainable representation that can guide the ego vehicle 420. A first metric is an average displacement error (ADE), in which an average L2-norm between the generated trajectories and ground truth trajectories is evaluated. For example the ADE measures how well the AGN model generates trajectories that mimic those from the real-world driving dataset. A second evaluation metric is a minimum distance to other agents along the generated trajectory (also referred to as safety distance). For example, the minimum distance is a safety measure that evaluates the risk of collision. A third evaluation metric is a maximum acceleration along the generated trajectory.

As shown in FIG. 8, an LSTM is a component in the trajectory generation module 840. In these aspects of the present disclosure, the trajectory generation module 840 outputs a velocity profile along the desired lane. In this example, finite differences may be used to estimate the acceleration profile, and a maximum value is used as a metric. In addition, acceleration is associated with a comfort level of the output velocity profile along the desired lane.

Evaluating a capability of the AGN decoder 850 to learn an explainable representation that can guide the ego vehicle 420 may involve four different settings. For example, a baseline setting corresponds to the vehicle trajectory planner system 800 of FIG. 8 without the AGN 830 module. In addition, an AGN setting refers to the nominal setting in FIG. 8. Similarly, in a bootstrapped AGN setting, the AGN 830 is initialized with the automata for the following formula:

$$\phi\text{interaction}=$$

$$\mathcal{G} \text{ ((distToAgent<2} \land \neg \text{agentVel<3)} \rightarrow \mathcal{X} \text{ (vel<3))} \land$$

$$\mathcal{G} \text{ ((} \neg \text{distToAgent<2} \lor \text{agentVel<3)} \rightarrow \mathcal{X} \text{ (vel>5))}$$

where distToCar is the distance of the ego vehicle 420 to the nearest road agent (e.g., car or pedestrian), and agentVel is a velocity of the nearest road. In addition, $\phi_{interaction}$ indicates that "if the nearest agent is 2 meters from the ego vehicle and that agent's velocity is not less than 3 m/s, then the ego should slow down to less than 3 m/s. Otherwise the ego should drive at a speed greater than 5 m/s." The $\phi_{interaction}$ describes an interaction model and the associated automaton used to initialize the AGN 830 module. In these aspects of the present disclosure, the thresholds in the predicates and the edge connections are subject to change during training. An additional setting is an AGN with auxiliary loss setting. In this setting, the MSE loss is subtracted by a weighted robustness of formula $\phi_{interaction} \land \mathcal{G}$ (distToAgent>1)$\land \mathcal{G}$ (accel<5) (e.g., minimizing the MSE loss and maximizing the robustness are desired). Here the generated trajectory not only satisfies the interaction specification in $\phi_{interaction}$, but also maintains a minimum distance of 1 meter from other agents and produces a maximum acceleration of less than 5 m/s$^2$.

Figure 9:
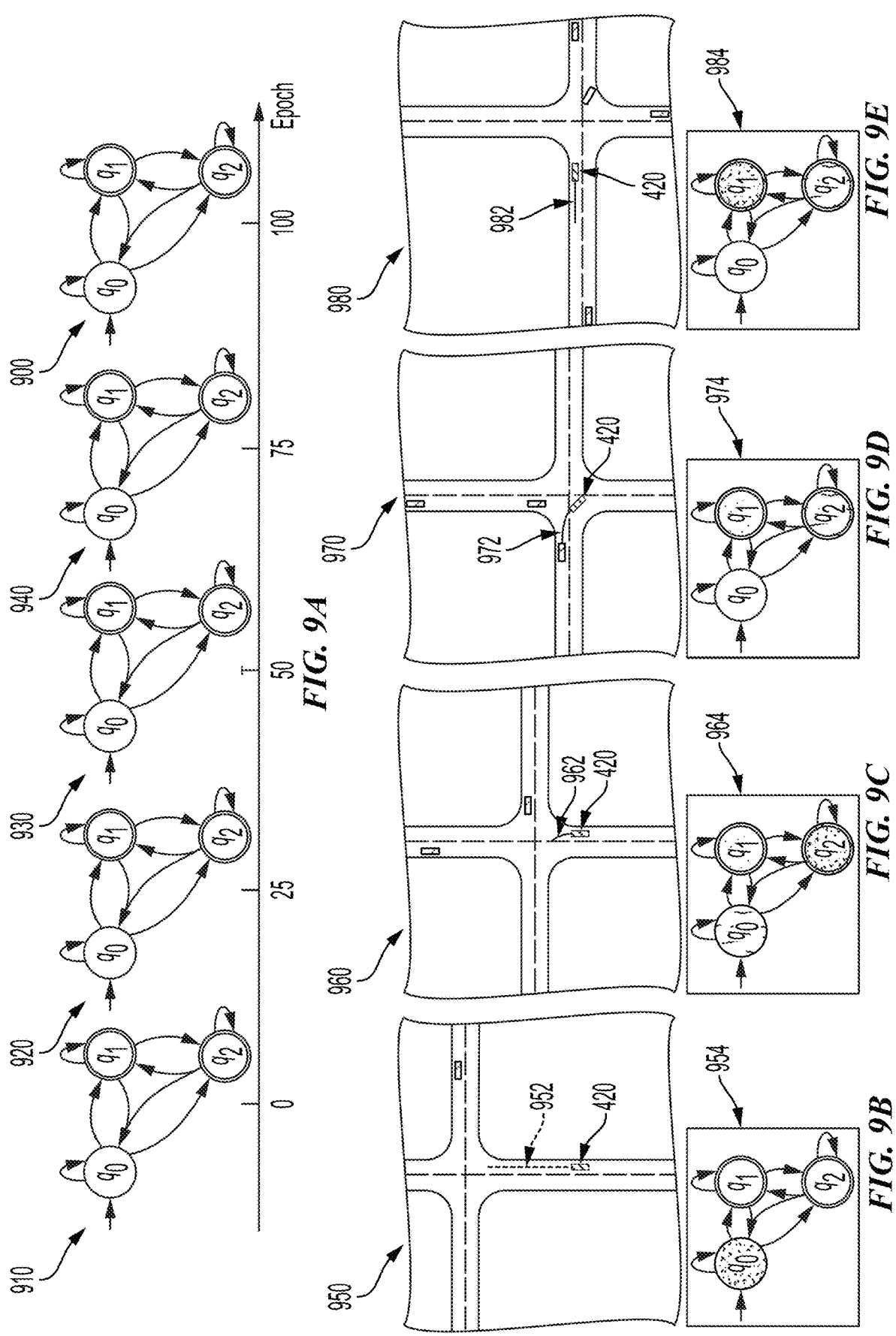
FIGS. 9A to 9E illustrate a simulated intersection environment that serves to evaluate an automaton recovery capability and explainability of the automaton generative network (AGN) module of FIG. 8, according to aspects of the present disclosure.

FIGS. 9A to 9E illustrate a simulated intersection environment that serves to evaluate an automaton recovery capability and explainability of the AGN 830 module of FIG. 8, according to aspects of the present disclosure. As described above, FIG. 5B shows the ground truth automaton of the DFA 550 used to generate the synthetic driving dataset. FIG. 9A shows a learned DFA 900, for example, recovered from the AGN 830 module using the method described in Section I-C as a function of a learning epoch. In this example, the thickness of the edges corresponds to a strength of the connection.

As shown in FIG. 9A, at epoch 0 the AGN 830 module of the AGN decoder 850 is randomly initialized to generate a first DFA 910, with all edges having similar presence. As learning progresses with a second DFA 920 at epoch 25, a third DFA 930 at epoch 50,and a fourth DFA 940 at epoch 75, the edges to and from state $q_0$ weaken, while those that transition between states $q_1$ and $q_2$ (and their self-loops) strengthen. At epoch 100, the state $q_0$ becomes a transitional initial state and most transitions stay within states $q_1$ and $q_2$. Even though weakened, the transitions to state $q_0$ do not disappear (unlike the ground truth automaton of FIG. 5B) because their corresponding weights are nonzero. This result shows that instead of exactly recovering the ground truth automaton, the AGN 830 module is able to extract its important functional component.

FIGS. 9B to 9E execute traces of an intersection left turn performed by an ego vehicle 420 to perform various trajectories, according to aspects of the present disclosure. FIG. 9B illustrates the ego vehicle 420 approaching an intersection prior to making a left turn as illustrated by a first execution tract 952 of a first trajectory 950. FIG. 9C illustrates the ego vehicle 420 beginning the left turn as the ego vehicle 420 enters the intersection, as illustrated by a second execution tract 962 of a second trajectory 960. FIG. 9D illustrates the ego vehicle 420 completing the left turn and leaving the intersection, as illustrated by a third execution tract 972 of a third trajectory 970. FIG. 9E illustrates the ego vehicle 420 after the left turn proceeding away from the intersection, as illustrated by a fourth execution tract 982 of a fourth trajectory 980.

In this example, the automaton states q generated by the AGN 830 module (e.g., 900, 910, 920, 930, and 940) of FIG. 9A are a 3-vector representing the probability of being in each state. In the automaton (e.g., 954, 964, 974, 984) shown on the lower left corner of FIGS. 9B-9E, a darker node corresponds to higher probability. In this example, the automaton states q are initialized at [1,0,0]. As illustrated by the generated automaton (e.g., 954, 964, 974, 984) in FIGS. 9B-9E, node qi serves as a fast moving mode and node $q_2$ as a slow moving (yielding) mode. The automaton states q shift to node $q_1$ when the intersection is clear to navigate and to node $q_2$ when there are vehicles in the intersection.

Figure 10:
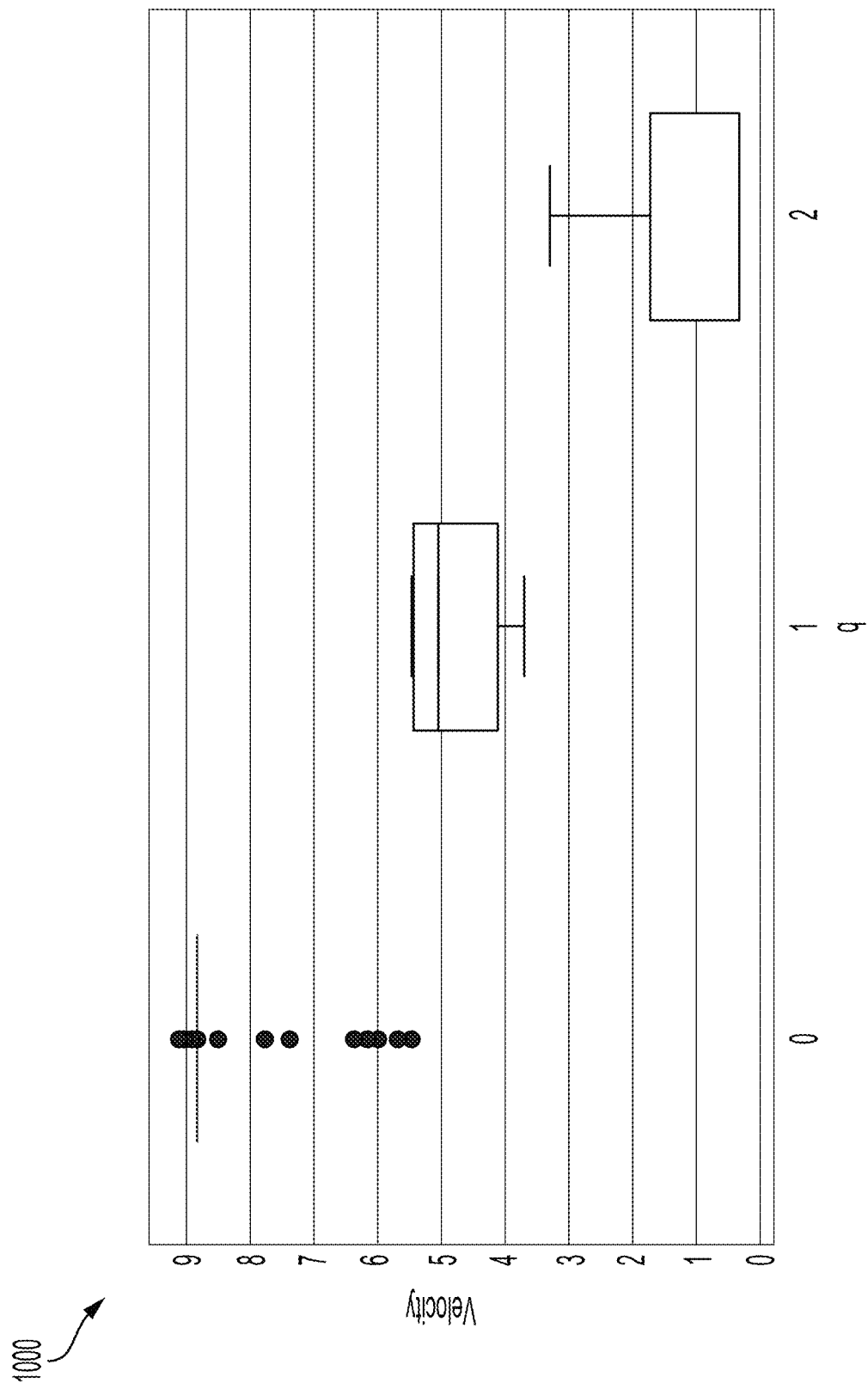
FIG. 10 is a velocity versus trajectory state graph illustrating learned automaton generative network (AGN) modes, according to aspects of the present disclosure.
Figures 11A, 11B:
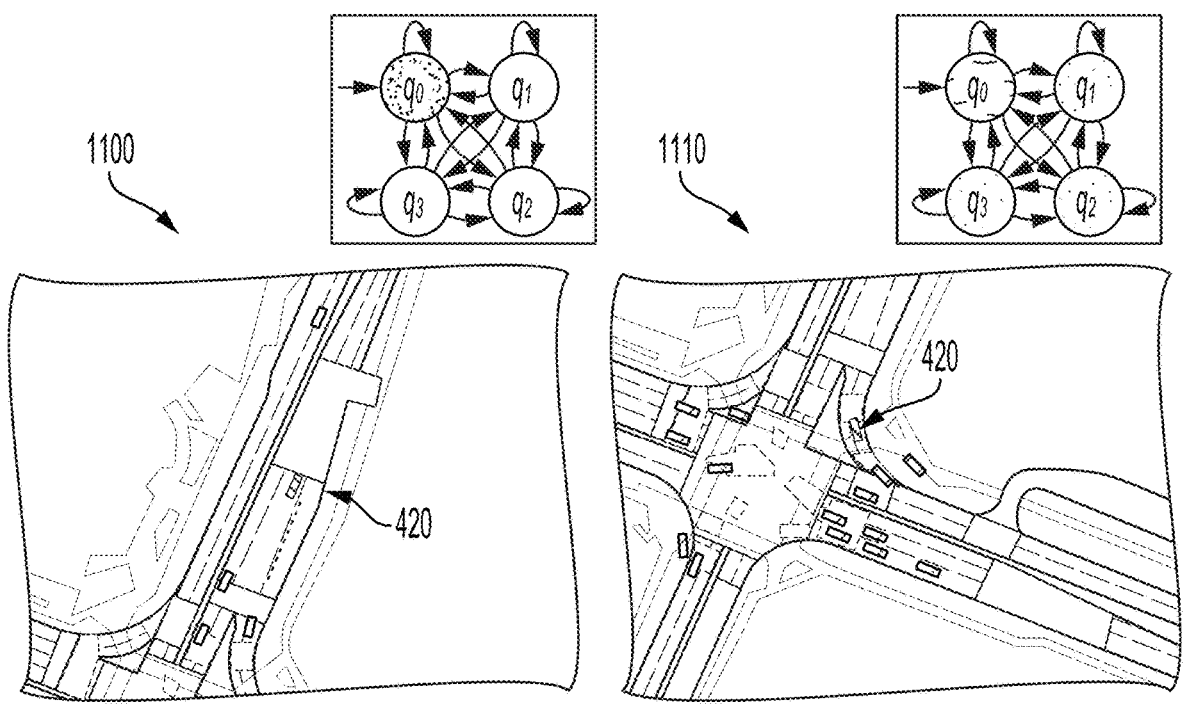
FIGS. 11A to 11D illustrate an execution trace for a real-world driving environment using a model trained with an automaton generative network (AGN), according to aspects of the present disclosure.
Figures 11C, 11D:
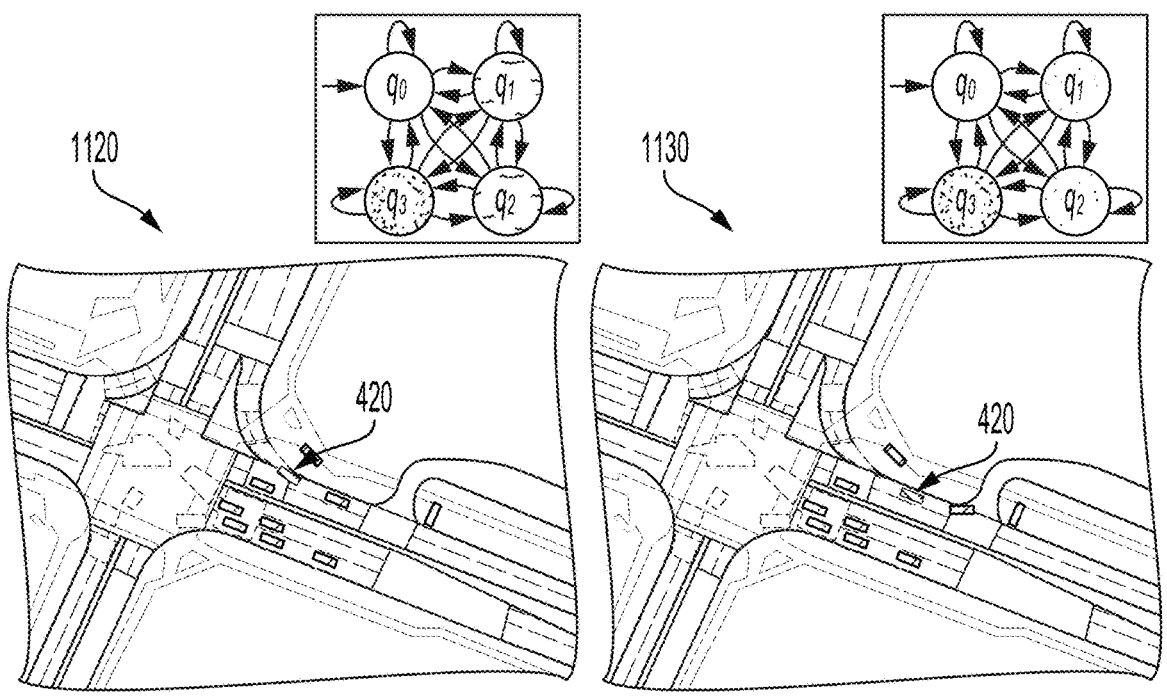

FIG. 10 is a velocity versus trajectory state graph illustrating learned AGN modes, according to aspects of the present disclosure. An x-axis of a velocity versus trajectory state graph 1000 is obtained, for example, by arg max(q) function. As shown in FIG. 10, a node $q_0$ corresponds to the initialization velocities, and nodes $q_1$ and $q_2$ corresponds to two navigation modes with well-separated velocity distributions. In particular, the automaton states q shift to node $q_1$ when the intersection is clear to navigate and to node $q_2$ when there are vehicles in the intersection.

FIGS. 11A to 11D illustrate execution traces for a real-world driving environment using a model trained with an automaton generative network (AGN), according to aspects of the present disclosure. In this example, the ego vehicle 420 is shown, including a green dotted trajectory, which is the ground truth, and a black trajectory, which is generated by the learned model. The dot-dash line represents the desired lane center. In these examples, the ego vehicle 420 is making a right turn and slowing down as it's approaching the front vehicle. FIGS. 11A to 11D illustrate, in an upper right corner, automatons (e.g., 1100, 1110, 1120, 1130).

In FIGS. 11A to 11D, the automatons (e.g., 1100, 1110, 1120, 1130) illustrate that as a distribution of the automaton states q shift more towards node $q_3$, the model outputs a shorter path. This observed behavior is possible because the AGN 830 module of the AGN decoder 850 in FIG. 8 provides a soft representation of the automatons (e.g., 1100, 1110, 1120, 1130). In addition, the learned edges of the automatons (e.g., 1100, 1110, 1120, 1130) illustrate that node $q_1$ is the dominant mode of operation (e.g., strong incoming edges and self-loop).

Figure 12A:
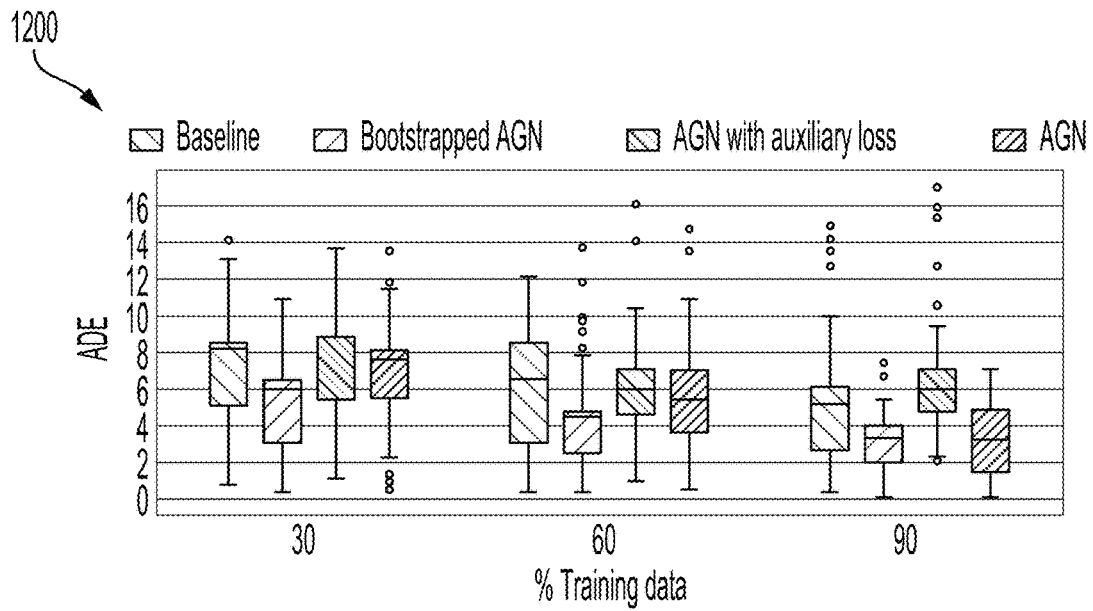
FIGS. 12A to 12C are graphs illustrating a sample efficiency in which comparison cases are trained at 30%, 60%, 90% of the training set (e.g., a full validation set is used for evaluation), according to aspects of the present disclosure.
Figure 12B:
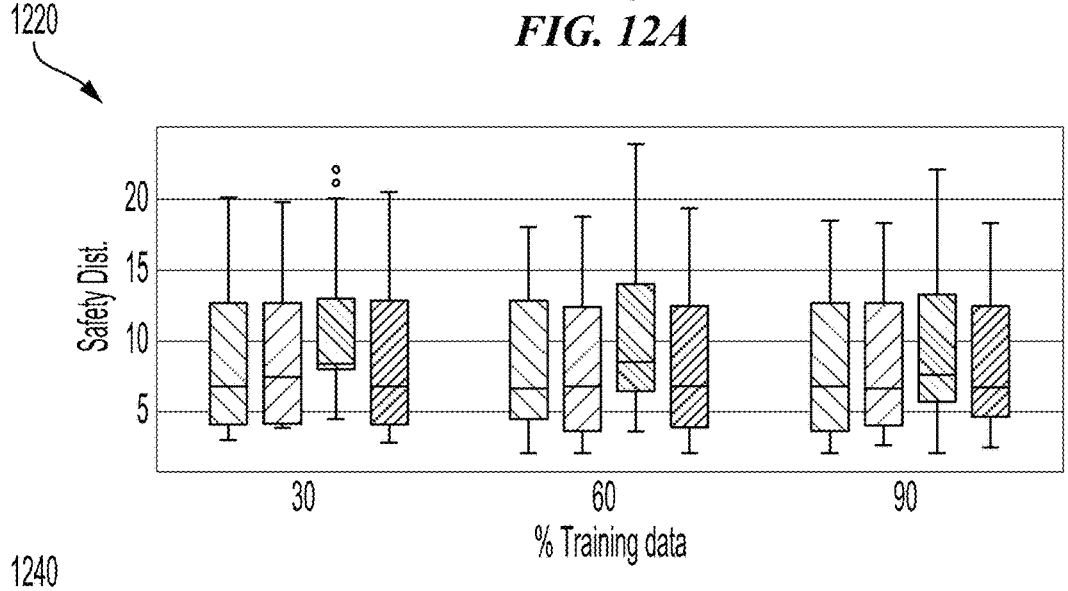
Figure 12C:
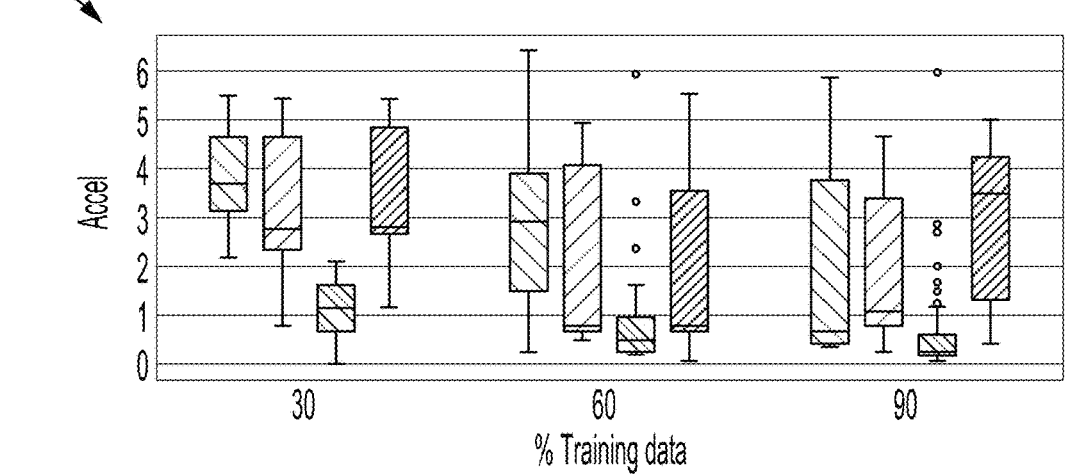

FIGS. 12A to 12C are graphs illustrating a sample efficiency in which comparison cases are trained at 30%, 60%, 90% of the training set (e.g., a full validation set is used for evaluation), according to aspects of the present disclosure.

FIGS. 12A to 12C illustrate that a Bootstrapped AGN noticeably outperforms other methods at low percentage data in terms of ADE, as shown in FIG. 12A. FIGS. 12A to 12C clearly serve as evidence that initializing the AGN 830 module with sufficient priors can compensate for a lack of data to an extent. As shown in FIG. 12B, a safety distance is not effected by the percentage of training data. In this example, a lane kinematics model used by the trajectory generation module of the AGN decoder 850 constrains the generated trajectory on the desired lane center. Assuming road agents behave rationally on average, the average safety distance can always be maintained, as shown in FIG. 12B.

Table I shows the statistics of the evaluation metrics based on training (using a full training set). For example, bold numbers highlight desirable outcomes (e.g., minimum ADE (FIG. 12A), acceleration (FIG. 12B), and maximum safety distance (FIG. 12C)). In this example, AGN and Bootstrapped AGN performs on par in terms of ADE, with AGN performing slightly better. Initializing the AGN 830 module with a prior helps with sample efficiency but can also be restrictive to what it can learn. In this example, the AGN 830 module is initialized with an initial $W^L$ matrix that consists only of 0s and 1s (an exact interpretation of the automaton in FIG. 5B). This type of weight initialization with only 0 and 1 elements may hinder the AGN's ability to adapt to data. As further illustrated in Table I, the results for AGN with auxiliary loss show that in this setting the agent tries to balance minimizing the ADE and satisfying the given set of rules. In this example, the agent sacrificed ADE to significantly improve satisfaction of the given rule.

TABLE 1

PERFORMANCE METRIC STATISTICS FOR THE REAL WORLD DATASET.
BOLD HIGHLIGHTS THE MOST DESIRABLE OUTCOMES.

|  | ADE (m) | | | | Min Dist. To Other Agents (m) | | | | Max Accel (m/s²) | | | |
|---|---|---|---|---|---|---|---|---|---|---|---|---|
|  | min | mean | max | 90 percentile | min | mean | max | 90 percentile | min | mean | max | 90 percentile |
| Baseline | 1.27 | 4.33 | 14.81 | 8.12 | 1.24 | 7.95 | 16.51 | 14.43 | 0.93 | 1.60 | 4.32 | 3.87 |
| AGN | 1.09 | 2.51 | 13.93 | 5.02 | 2.03 | 8.51 | 19.17 | 14.44 | 1.02 | 1.89 | 4.89 | 3.42 |
| Bootstrapped AGN | 0.86 | 2.82 | 13.35 | 6.82 | 0.58 | 8.85 | 17.67 | 14.29 | 1.69 | 2.01 | 4.21 | 3.11 |
| AGN with auxiliary loss | 2.39 | 6.84 | 15.52 | 10.25 | 1.09 | 10.31 | 24.92 | 16.87 | 0.14 | 0.84 | 2.94 | 2.01 |

Figure 13:
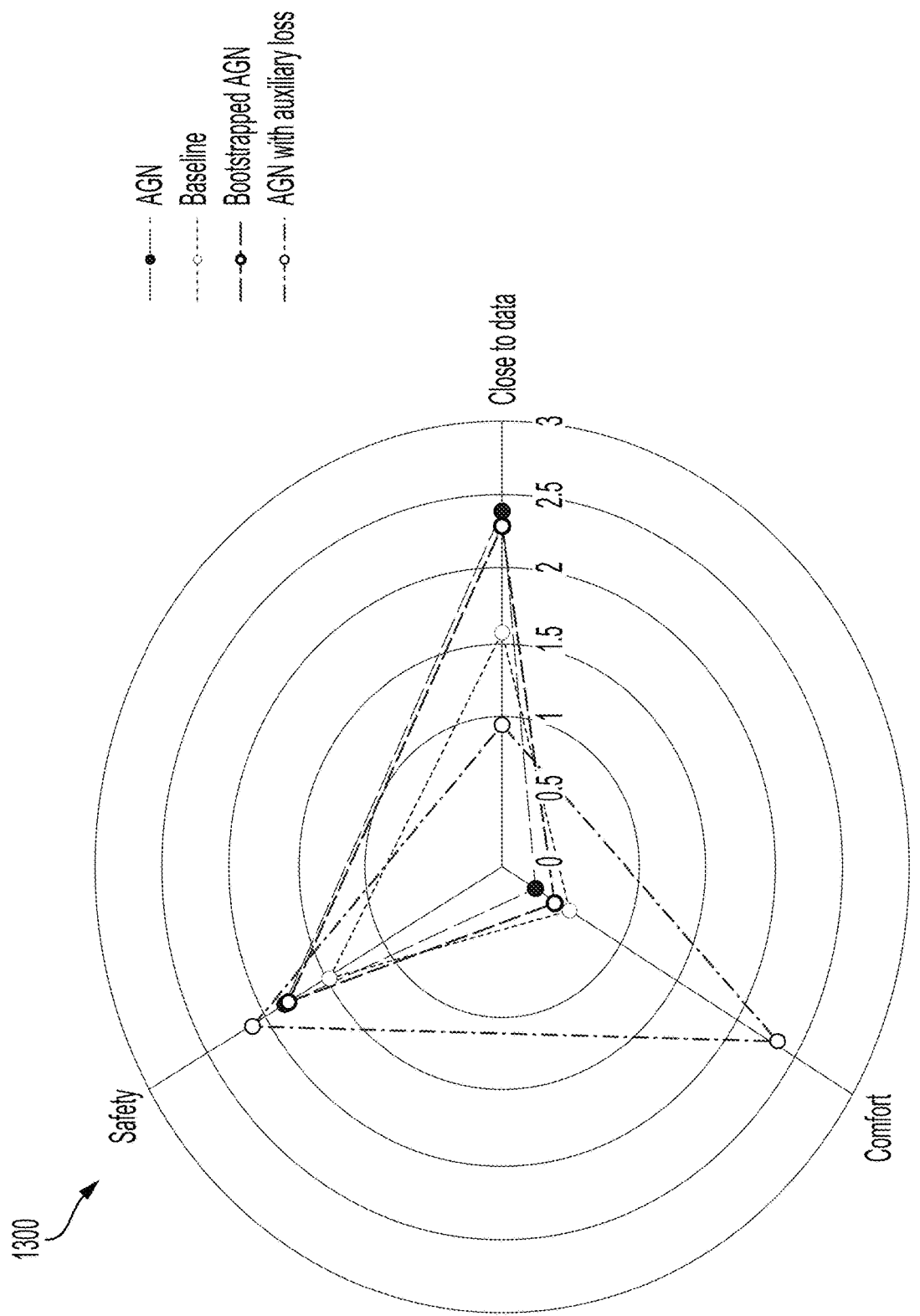
FIG. 13 is a diagram illustrating a radar plot that overlays the results in Table I in terms of closeness to data, safety, and comfort, according to aspects of the present disclosure.

FIG. 13 is a diagram 1300 illustrating a radar plot that overlays the results in Table I in terms of closeness to data (e.g., 1/ADE (average displacement error)), safety (e.g., minimum distance to other agents), and comfort (e.g., 1/|maximum acceleration|), according to aspects of the present disclosure. In this example, a transformation is over the mean values across the validation set and data is normalized to the interval. This transformation is specified to put the results on the same scale for comparison (e.g., in the radar plot larger value is more desirable).

As shown in FIG. 13, the AGN and the Bootstrapped AGN have similar performance (e.g., their triangles almost overlap) and achieves the best results in imitating the dataset. The AGN with auxiliary loss achieves a large improvement in comfort level while suffering deteriorated imitative behavior. This trade-off is governed by the relative weighting between the imitation loss and the robustness loss. For the same agent, this example illustrates that the improvement in comfort level is much more significant than that in safety. This is due to the difference in the magnitude of the robustness for predicates distToAgent>1 (safety) and maxAccel<5 (comfort) which affects their weightings in the robustness loss. Normalizing the predicate robustness can alleviate this problem.

In aspects of the present disclosure, the AGN 830 module takes the number of automaton nodes as a hyper-parameter, which if set to be too small, may become a bottleneck to learning complex behaviors. Learning the minimum number of AGN nodes that best describes the dataset using graph generative methods is a practical extension to the current version. The number of weights in an AGN scales quadratically with the number of nodes and exponentially with the number predicates ($v^\Sigma$ is constructed with the powerset of the predicates). Scalability becomes a problem when the number of predicates is large. Deep learning infrastructure is in place to process massive networks, therefore, this problem may not be the main concern in practice. Having to manually design the predicates can be helpful when we know what the influential factors of the task are. Other times this requirement can be tedious.

In other aspects of the present disclosure, an alternative/complement is to use learned predicates as input to the AGN (e.g., $v^\Sigma$ can be the output of an upstream network) at the cost of reduced explainability. Lastly, the current AGN assumes that the dataset contains only positive examples (all trajectories are valid). It can be valuable to learn from negative examples. This involves configuring the AGN 830 module to encode a blocking state (e.g., a non-accepting terminal state).

Figure 14:
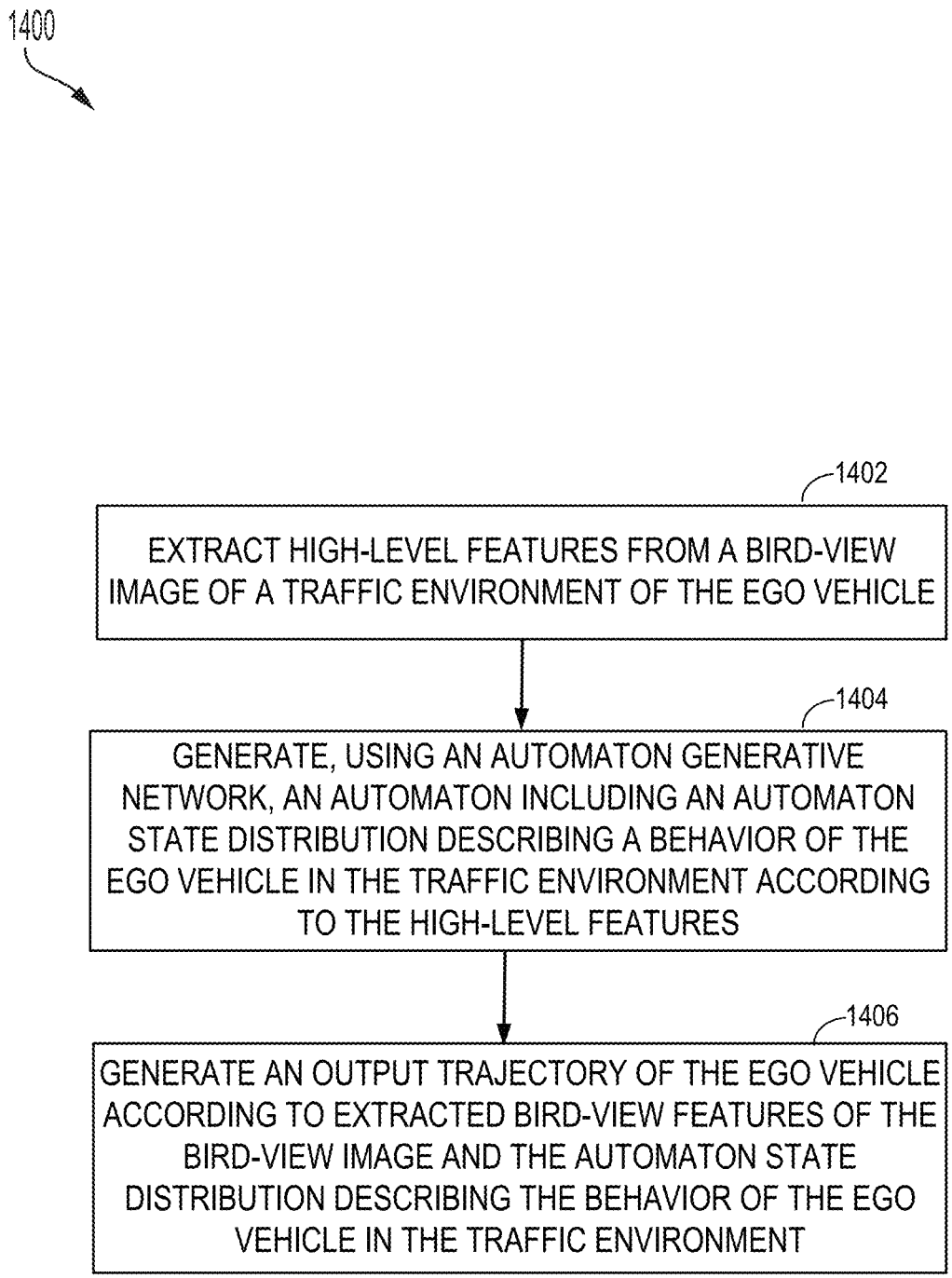
FIG. 14 is a flowchart illustrating a method of generating an output trajectory of an ego vehicle, according to aspects of the present disclosure.

FIG. 14 is a flowchart illustrating a method of generating an output trajectory of an ego vehicle, according to aspects of the present disclosure. A method 1400 being at block 1402, in which high-level features are extracted from a bird-view image of a traffic environment of the ego vehicle. For example, a bird-view image 810 is passed through a CNN feature extractor 820 to obtain bird-view features 822 (e.g., high-level features) that are provided as an input to a trajectory generation module 840 of the AGN decoder 850. The high level features 802 may include agent positions, velocities, lane representations shown in the bird-view image 810.

At block 1404, an automaton including an automaton state distribution describing a behavior of the ego vehicle in the traffic environment is generated using an automaton generative network. For example, as shown in FIG. 8, in the vehicle trajectory planner system 800, high level features 802 (e.g., agent positions, velocities, lane representations, etc.) serve as states used to calculate the alphabet vector $v^\Sigma$ by the AGN 830. For example, FIG. 5B shows the ground truth automaton of the DFA 550 used to generate the synthetic driving dataset. FIG. 9A shows a learned DFA 900, for example, recovered from the AGN 830 module using the method described in Section I-C as a function of a learning epoch. In this example, the thickness of the edges corresponds to a strength of the connection.

At block 1406, an output trajectory of the ego vehicle is generated according to extracted bird-view features of the bird-view image and the automaton state distribution describing the behavior of the ego vehicle in the traffic environment. For example, as shown in FIG. 8, the AGN 830 outputs an automaton state distribution as input to the trajectory generation module 840 along with the bird-view features 822 for generating an output trajectory 852. The method 1400 may also include bootstrapping, by the automaton generative network, according to logic priors. The method 1400 may further include training an automaton structure of the automaton generative network according to driving data.

In some aspects, the methods shown in FIG. 14 may be performed by the SOC 100 (FIG. 1) or the software architecture 200 (FIG. 2) of the autonomous vehicle 150. That is, each of the elements or method may, for example, but without limitation, be performed by the SOC 100, the software architecture 200, the processor (e.g., CPU 102) and/or other components included therein of the autonomous vehicle 150, or the vehicle trajectory planner system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of generating an output trajectory of an ego vehicle, the method comprising:
    extracting high-level features from a bird-view image of a traffic environment of the ego vehicle;
    generating, using an automaton generative network, an automaton including an automaton state distribution describing a behavior of the ego vehicle in the traffic environment according to the high-level features, in which the automaton comprises a predicate deterministic finite state automaton (DFA) having learned weights; and
    generating the output trajectory of the ego vehicle according to extracted bird-view features of the bird-view image and the automaton state distribution describing the behavior of the ego vehicle in the traffic environment.

2. The method of claim 1, further comprising performing a vehicle control action to maneuver the ego vehicle along the output trajectory.

3. The method of claim 1, in which the high-level features comprise agent positions, velocities, and lane representations shown in the bird-view image.

4. The method of claim 1, further comprises learning from continuous actions and continuous trajectories.

5. A method of generating an output trajectory of an ego vehicle, the method comprising:
    extracting high-level features from a bird-view image of a traffic environment of the ego vehicle;
    generating, using an automaton generative network, an automaton including an automaton state distribution describing a behavior of the ego vehicle in the traffic environment according to the high-level features by calculating, using the automaton generative network, an alphabet vector corresponding to the automaton state distribution according to the high-level features of the bird-view image; and
    generating the output trajectory of the ego vehicle according to extracted bird-view features of the bird-view image and the automaton state distribution describing the behavior of the ego vehicle in the traffic environment.

6. A method of generating an output trajectory of an ego vehicle, the method comprising:
    extracting high-level features from a bird-view image of a traffic environment of the ego vehicle;
    generating, using an automaton generative network, an automaton including an automaton state distribution describing a behavior of the ego vehicle in the traffic environment according to the high-level features;
    generating the output trajectory of the ego vehicle according to extracted bird-view features of the bird-view image and the automaton state distribution describing the behavior of the ego vehicle in the traffic environment;
    bootstrapping, by the automaton generative network, according to logic priors; and
    training an automaton structure of the automaton generative network according to driving data.

7. The method of claim 6, in which the logic priors comprise temporal logic formulas defining the behavior of the ego vehicle in the traffic environment.

8. A non-transitory computer-readable medium having program code recorded thereon for generating an output trajectory of an ego vehicle, the program code being executed by a processor and comprising:
    program code to extract high-level features from a bird-view image of a traffic environment of the ego vehicle;
    program code to generate, using an automaton generative network, an automaton including an automaton state distribution describing a behavior of the ego vehicle in the traffic environment according to the high-level features, in which the automaton comprises a predicate deterministic finite state automaton (DFA) having learned weights; and
    program code to generate the output trajectory of the ego vehicle according to extracted bird-view features of the bird-view image and the automaton state distribution describing the behavior of the ego vehicle in the traffic environment.

9. The non-transitory computer-readable medium of claim 8, further comprising program code to perform a vehicle control action to maneuver the ego vehicle along the output trajectory.

10. The non-transitory computer-readable medium of claim 8, in which the program code to generate the automaton comprises program code to calculate, using the automaton generative network, an alphabet vector corresponding to the automaton state distribution according to the high-level features of the bird-view image.

11. The non-transitory computer-readable medium of claim 8, in which the high-level features comprise agent positions, velocities, and lane representations shown in the bird-view image.

12. The non-transitory computer-readable medium of claim 8, further comprises program code to learn from continuous actions and continuous trajectories.

13. The non-transitory computer-readable medium of claim 12, in which the program code to learn comprises:

program code to bootstrap, by the automaton generative network, according to logic priors; and program code to train an automaton structure of the automaton generative network according to driving data.

14. The non-transitory computer-readable medium of claim 13, in which the logic priors comprise temporal logic formulas defining the behavior of the ego vehicle in the traffic environment.

15. A system for generating an output trajectory of an ego vehicle, the system comprising:

a vehicle perception module to extract high-level features from a bird-view image of a traffic environment of the ego vehicle;

an automaton generative network to generate an automaton including an automaton state distribution describing a behavior of the ego vehicle in the traffic environment according to the high-level features, in which the automaton comprises a predicate deterministic finite state automaton (DFA) having learned weights; and a trajectory generation module to generate the output trajectory of the ego vehicle according to extracted bird-view features of the bird-view image and the automaton state distribution describing the behavior of the ego vehicle in the traffic environment.

16. The system of claim 15, further comprising a vehicle control selection module to select a vehicle control action to maneuver the ego vehicle along the output trajectory.

17. The system of claim 15, in which the high-level features comprise agent positions, velocities, and lane representations shown in the bird-view image.

* * * * *